(12) United States Patent
Waldner

(10) Patent No.: US 10,907,922 B2
(45) Date of Patent: Feb. 2, 2021

(54) INVISIBLE RIFLE WALL MOUNT

(71) Applicant: Steven D. Waldner, Fargo, ND (US)

(72) Inventor: Steven D. Waldner, Fargo, ND (US)

( * ) Notice: Subject to any disclaimer, the term of this patent is extended or adjusted under 35 U.S.C. 154(b) by 36 days.

(21) Appl. No.: 16/388,820

(22) Filed: Apr. 18, 2019

(65) Prior Publication Data
US 2020/0333098 A1  Oct. 22, 2020

(51) Int. Cl.
  *F41A 23/18* (2006.01)
  *F16M 13/02* (2006.01)
  *F41A 9/65* (2006.01)

(52) U.S. Cl.
  CPC ............ *F41A 23/18* (2013.01); *F16M 13/02* (2013.01); *F41A 9/65* (2013.01)

(58) Field of Classification Search
  CPC .... F41A 23/18; F41A 9/64; F41A 9/65; F41A 2/22; F41C 27/00; F41C 17/38; F16B 1/00; F16B 2001/0035; A45F 5/02
  USPC ...................... 248/309.1, 310, 312, 317, 324
  See application file for complete search history.

(56) References Cited

U.S. PATENT DOCUMENTS

| | | | | |
|---|---|---|---|---|
| 3,637,180 A * | 1/1972 | Parry | ............... | A47B 81/005 248/553 |
| 4,198,026 A | 4/1980 | Capolupo | | |
| 4,551,939 A * | 11/1985 | Kitchens | ............ | A01K 97/10 248/513 |
| 5,806,224 A | 9/1998 | Hager | | |
| 5,937,559 A * | 8/1999 | Jennen | ................. | F41A 23/18 211/64 |
| 6,128,847 A * | 10/2000 | Langner | ................ | F41A 17/54 42/106 |
| 6,330,815 B1 * | 12/2001 | Duncan | ................... | B60R 7/14 211/4 |
| 6,427,497 B1 * | 8/2002 | Mossberg | ............ | A47B 81/005 211/4 |
| 7,527,150 B2 * | 5/2009 | Tong | ...................... | A47F 7/024 206/376 |
| 7,571,671 B2 * | 8/2009 | Engel | ..................... | F41A 3/18 89/161 |
| 8,069,601 B1 | 12/2011 | Fitzpatrick | | |
| 8,533,876 B2 | 9/2013 | Bonk | | |
| 8,943,729 B2 | 2/2015 | Williams | | |
| 9,072,287 B2 * | 7/2015 | Holzer | ................. | A01K 97/10 |
| 9,261,326 B1 | 2/2016 | Chandler | | |
| 9,395,153 B2 * | 7/2016 | Bottrell | .................... | F41A 9/24 |
| 9,677,835 B1 * | 6/2017 | Binns | ..................... | F41A 17/54 |
| 9,683,798 B2 * | 6/2017 | Butler | ..................... | F41A 9/83 |

(Continued)

*Primary Examiner* — Nkeisha Smith
(74) *Attorney, Agent, or Firm* — Neustel Law Offices

(57) ABSTRACT

An invisible rifle wall mount for securely mounting a rifle on a wall or surface or wall panel. The invisible rifle wall mount cannot be seen when a rifle is mounted on it, and the mount generally includes a base adapted for mounting on the surface, such as a wall, the base comprising a wall-mount portion and a plug extending away from the wall-mount portion, the plug comprising a plurality of plug locking surfaces arranged circumferentially on the plug. The wall mount may also comprise a rifle mount with a magazine and a socket extending from the magazine, the socket adapted for coupling to the plug, the socket comprising an opening and a plurality of socket locking surfaces in the opening that engage the plug locking surfaces to prevent the socket and rifle mount from rotating relative to the plug when the socket and the plug are coupled.

19 Claims, 22 Drawing Sheets

(56) References Cited

U.S. PATENT DOCUMENTS

| | | | |
|---|---|---|---|
| 9,933,218 B2* | 4/2018 | Butler | F41A 9/64 |
| 10,072,904 B2* | 9/2018 | Binns | F41A 17/44 |
| 10,179,548 B2* | 1/2019 | Fiedler | F16B 9/054 |
| 10,353,272 B2* | 7/2019 | Yowler | F16B 21/12 |
| 10,488,133 B1* | 11/2019 | Karczwski | F41A 17/54 |
| 2002/0175257 A1* | 11/2002 | Yen | B65D 73/0064 |
| | | | 248/309.1 |
| 2004/0045914 A1* | 3/2004 | Sells | A47B 81/005 |
| | | | 211/4 |
| 2008/0178509 A1* | 7/2008 | Pintar | F41A 17/02 |
| | | | 42/70.07 |
| 2010/0263255 A1* | 10/2010 | Harris | F41C 27/00 |
| | | | 42/90 |
| 2010/0276463 A1* | 11/2010 | Gregory | F41C 33/045 |
| | | | 224/198 |
| 2012/0174458 A1* | 7/2012 | Burnsed, Jr. | F41C 23/02 |
| | | | 42/85 |
| 2012/0255212 A1 | 10/2012 | Werner | |
| 2012/0255979 A1 | 10/2012 | Sitz | |
| 2013/0086835 A1* | 4/2013 | Minneman | F41A 23/16 |
| | | | 42/94 |
| 2018/0107094 A1* | 4/2018 | Yowler | F16M 11/08 |
| 2019/0154423 A1* | 5/2019 | Wood | F42B 39/02 |

\* cited by examiner

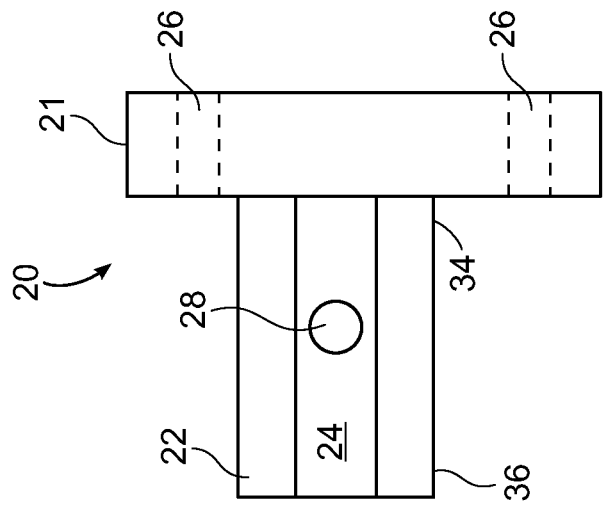
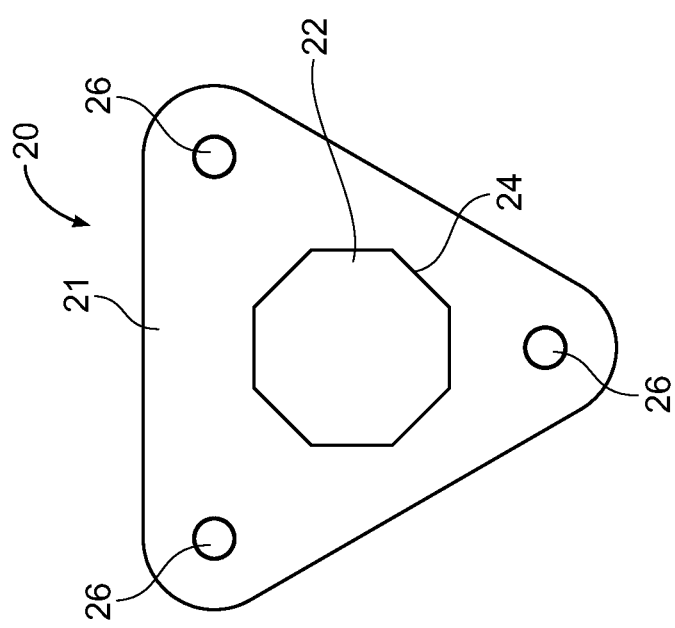
FIG. 12

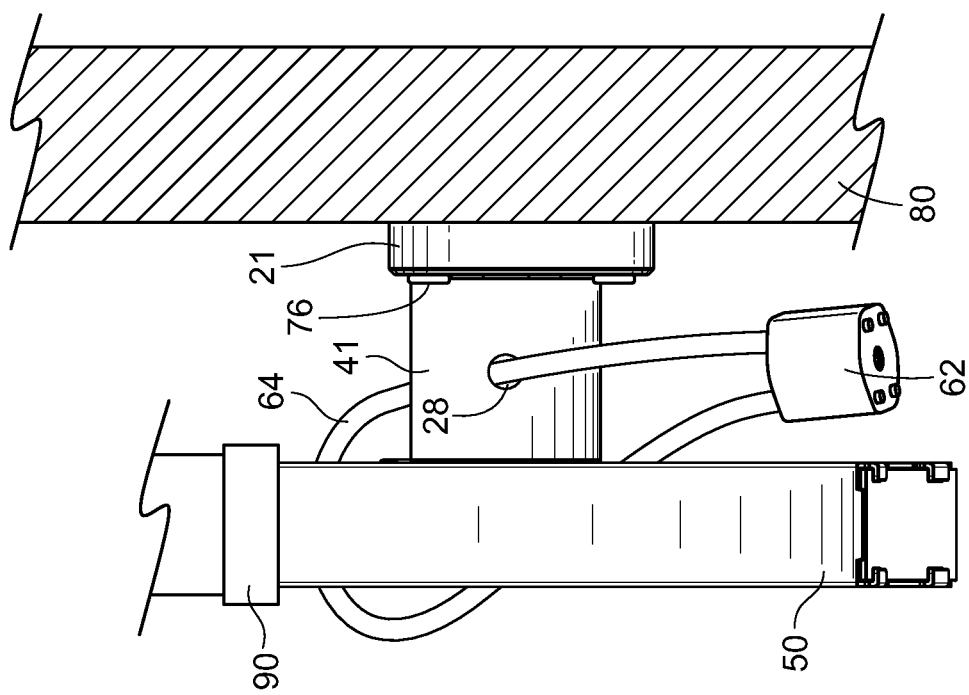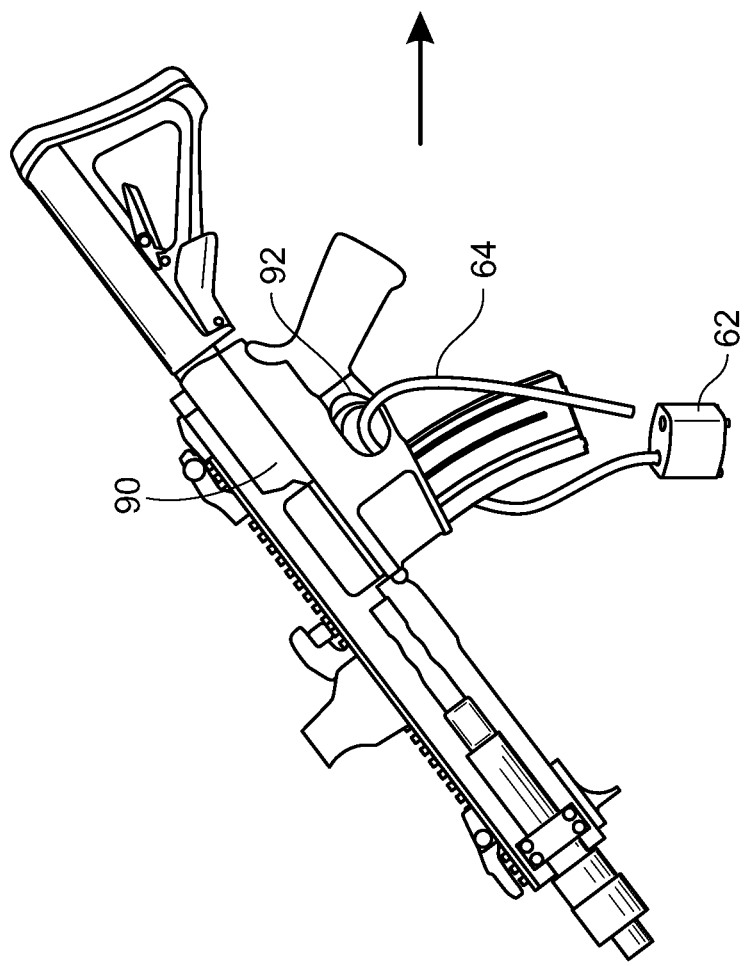
FIG. 15

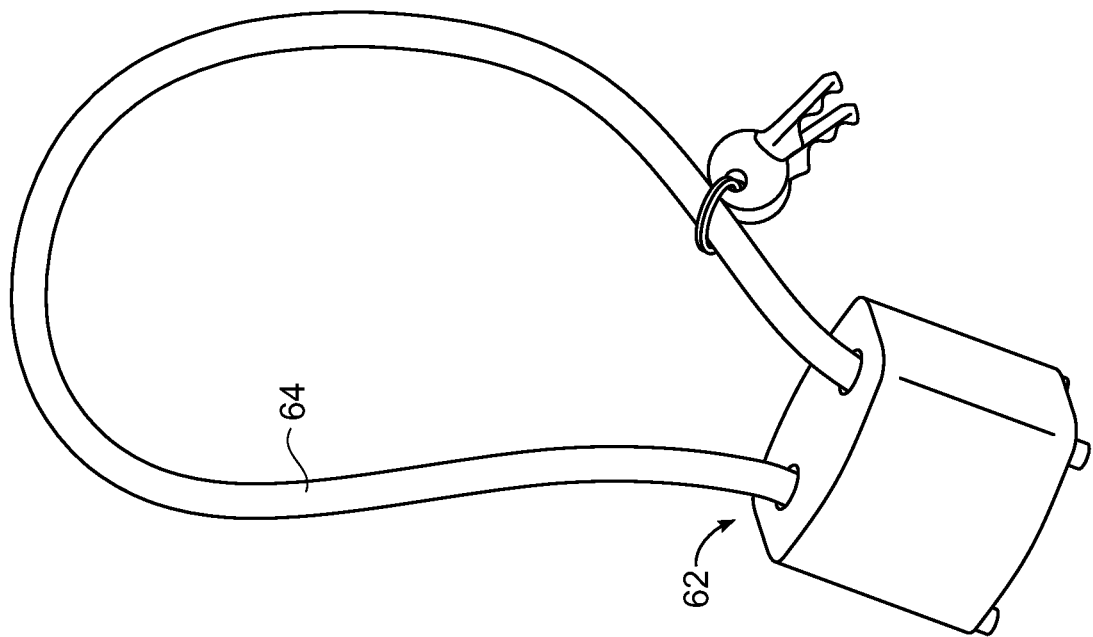
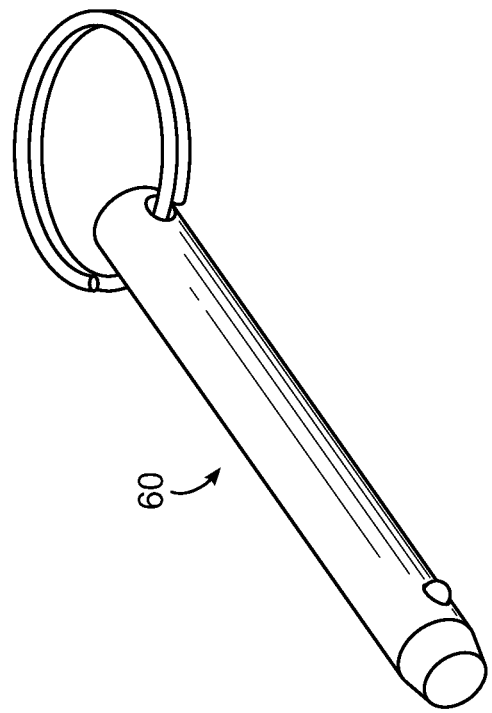
FIG. 21

INVISIBLE RIFLE WALL MOUNT

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to an invisible rifle wall mount for securely displaying a rifle or airsoft rifle on a wall without the support being readily visible.

Related Art

Any discussion of the related art throughout the specification should in no way be considered as an admission that such related art is widely known or forms part of common general knowledge in the field.

Mounting systems for mounting rifles to walls have been in use for many years. Devices or systems are not usually directed to any attempt to make the rifle look good while mounted on the wall, however, and typically are designed and intended to simply keep rifles readily available for quick access. Another function or goal of such systems and devices has been to provide for highly secure storage, again while paying little attention to aesthetics.

Further, many devices for mounting rifles on walls or other surfaces have consisted of multiple pieces, again at the expense of aesthetics.

SUMMARY

An example embodiment is directed to an invisible rifle wall mount. The invisible rifle wall mount includes a base adapted for mounting on a surface, such as a wall, the base comprising a wall-mount portion and a plug extending away from the wall-mount portion, the plug comprising a plurality of plug locking surfaces arranged circumferentially on the plug. In addition to embodiments adapted for mounting on a conventional wall, the wall-mount portion of the base may be adapted for mounting on any number of surfaces or panels, such as pegboards, slat-walls, or proprietary wall panels, such as panels with openings shaped and sized to accept connecting elements. For example, the base may include hooks or other connectors for mounting on such walls or panels.

The mount may also comprise a rifle mount comprising a magazine and a socket extending from the magazine, the socket adapted for coupling to the plug, the socket comprising an opening and a plurality of socket locking surfaces in the opening that engage the plug locking surfaces to prevent the socket and rifle mount from rotating relative to the plug when the socket and the plug are coupled.

In some example embodiments, the rifle mount is alignable and lockable at different rotational angles with respect to the plug. The plug may comprise a multi-sided cross section, for example, an octagonal cross section with flat sides. The flat external sides of the plug may engage with flat internal sides in the socket to prevent rotation of the socket and rifle mount. In addition, the plug and the socket may be slidably coupled by a spring-loaded binding post comprising a spring, the socket being slidable relative to the plug, between a first position and a second position, wherein the first position is closer to the wall-mount portion than the second position. In such an embodiment, the spring urges the socket toward the first position, and the plug locking surfaces and the socket locking surfaces engage when the socket is in the first position and disengage when the socket is in the second position.

In another example embodiment, the plug may comprise a plug hole extending transversely into the plug. The system may also include a rifle mount comprising a magazine and a socket extending from the magazine, the socket configured for the socket comprises a socket hole alignable with the plug hole when the plug is coupled to the socket. The rifle mount is releasably secured to the wall-mount base by insertion of a securing member through the socket hole and into the plug hole.

In still other example embodiments, the socket comprises a plurality of socket holes, each alignable with the plug hole when the rifle mount is in a different rotational orientation with respect to the plug, wherein the rifle mount is releasably securable in different orientations when a different socket hole is aligned with the plug hole. The plug holes and socket holes may be aligned at any orientation of the plug and socket. For example, the multi-sided cross sections of the plug and socket may dictate fixed rotational orientations of the magazine and socket with respect to the wall mount, and in each such orientation, the plug hole and at least one of the socket holes will be aligned, so that the magazine can be secured by the securing member, which may be inserted through the holes. The securing member may be a locking pin (e.g., a cotterless hitch pin), or it may be the cable of a lock, which may also be threaded through the trigger guard of a rifle mounted with the system.

One possible example cross section of the plug and the mating socket is an octagonal cross section. The socket comprises a multi-sided cross section that mates with the cross section of the plug to prevent the socket from rotating relative to the plug when the plug is coupled to the socket. In some embodiments, the socket is alignable at different rotational angles with respect to the plug. For example, if the plug has an octagonal cross section, a rifle attached to the magazine of the system can be oriented so that is horizontal, vertical, or has other orientations, at 45° increments. Of course, other angles and orientations are also possible, depending on the cross sectional shape of the plug and socket.

Some possible embodiments of the wall-mount system for rifles may further comprise an optional sizing adapter attached to the magazine, wherein the sizing adapter is sized and shaped to make the magazine insertable into the magazine receptacle of a rifle. For example, the magazine and sizing adapter may fit securely into an AR-15 or other rifle, so that the magazine (with its attached socket) can lock into the rifle's receptacle. With or without a sizing adapter, the rifle may be mounted on the wall using the system. When so mounted, the mounting system may be invisible, and the magazine can be made to have an appearance identical to an ordinary magazine, with the final effect being that the rifle appears to "float" on the wall or surface to which it is mounted.

There has thus been outlined, rather broadly, some of the embodiments of the invisible rifle wall mount in order that the detailed description thereof may be better understood, and in order that the present contribution to the art may be better appreciated. There are additional embodiments of the invisible rifle wall mount that will be described hereinafter and that will form the subject matter of the claims appended hereto. In this respect, before explaining at least one embodiment of the invisible rifle wall mount in detail, it is to be understood that the invisible rifle wall mount is not limited in its application to the details of construction or to the arrangements of the components set forth in the following description or illustrated in the drawings. The invisible rifle wall mount is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIG. 12 is a front and side view of a base of an invisible rifle wall mount, in accordance with an example embodiment.

FIG. 15 is a perspective view and another side view of an invisible rifle wall mount, in accordance with an example embodiment.

FIG. 21 is a perspective view of components of an invisible rifle wall mount, in accordance with an example embodiment.

DETAILED DESCRIPTION

A. Overview

Figure 1:
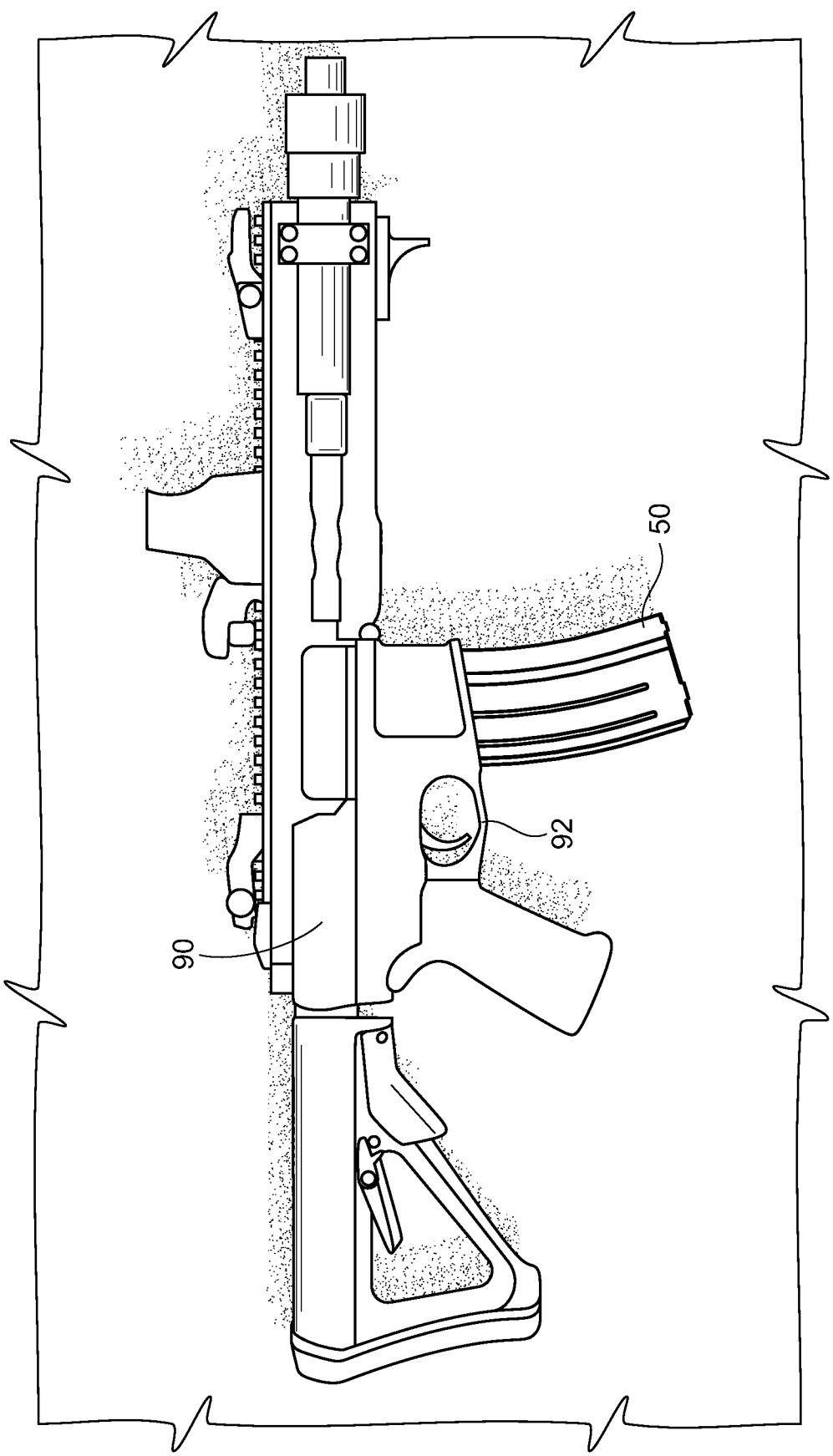
FIG. 1 is a front view of an invisible rifle wall mount in use, in accordance with an example embodiment.

An example invisible rifle wall mount system 10 generally comprises a base 20 adapted for mounting on a surface or panel, such as a wall, the base 20 comprising a wall-mount portion 21 and a plug 22 extending away from the wall-mount portion 21, the plug 22 comprising a plurality of plug locking surfaces 24 arranged circumferentially on the plug 22, for example, on the outer surface of the plug toward the second end 36 of the plug, spaced distally from the wall-mount portion 21, and spaced from the first end 34 of the plug 22. The plug 22 may also comprise a smooth, cylindrical portion 23 between the plug locking surfaces 24 and the wall-mount portion 21.

The system 10 may also comprise a rifle mount 40 comprising a magazine 50 and a socket 41 extending from the magazine, the socket 41 adapted for coupling to the plug 22, the socket 41 comprising a socket opening 46 and a plurality of socket locking surfaces 48 in the opening 46 that engage the plug locking surfaces 24 to prevent the socket 41 and rifle mount 40 from rotating relative to the plug 22 when the socket 41 and the plug 22 are coupled. The magazine 50 is connectable to an optional sizing adapter 52, so that the magazine will fit and lock into a standard magazine receptacle in a rifle.

For example, the magazine 50 and an optional sizing adapter 52 may substantially duplicate a known magazine, such as an AR-15 magazine, so that the magazine 50 can be securely attached to virtually any rifle 90 having an external magazine. Accordingly, when rifle mount 50 is attached to a rifle (or even an airsoft rifle) and the rifle mount 50 is then coupled to a base that is attached to a wall or other surface, the rifle or airsoft gun is mounted on the wall or surface, with the wall mount system 10 being invisible behind the rifle 90, and appearing to "float" on the wall. It should be noted, however, that a sizing adapter 52 is optional, and the system is usable with a rifle mount 50 in embodiments without a sizing adapter.

In some example embodiments, the rifle mount 40 is alignable and lockable at different rotational angles with respect to the base 20 and plug 22. The plug 22 may comprise a multi-sided cross section, for example, an octagonal cross section with flat sides, which comprises plug locking surfaces 24. The plug locking surfaces 24 of the plug may engage with flat internal sides (socket locking surfaces 48) in the socket 41 to prevent rotation of the socket and rifle mount. In addition, the plug 22 and the socket 41 may be slidably coupled by a spring-loaded binding post 70 comprising a spring 74, the socket 41 being slidable relative to the plug 22 between a first position and a second position, wherein the first position is closer to the wall-mount portion of the base 20 than the second position. In such an embodiment, the spring 74 urges the socket 41 toward the first position, and the plug locking surfaces 24 and the socket locking surfaces 48 engage when the socket 41 is in the first position and disengage when the socket 41 is in the second position.

The locking surfaces 24, 48 engage each other much as a socket wrench engages a nut, so that the socket 41 can slide over the plug 22 in the direction of their common axis, while being rotationally "locked" to each other due to the flat or otherwise locking surfaces 24 and 48, one set internal and one set external. Further, the rifle mount 40, which comprises a magazine 50 and the socket 41, can be aligned and locked in different rotational orientations with respect to the base 20.

In another example embodiment, the plug 22 may comprise a plug hole 28 extending transversely into the plug. The socket 41 may comprise one or more socket holes 45 alignable with the plug hole 28 when the plug 22 is coupled to the socket 41. In this example embodiment, the rifle mount 40 is releasably secured to the wall-mount base 20 by insertion of a locking pin 60 or cable 64 through the socket hole 45 and into the plug hole 28.

B. Wall-Mount Base

Figure 2:
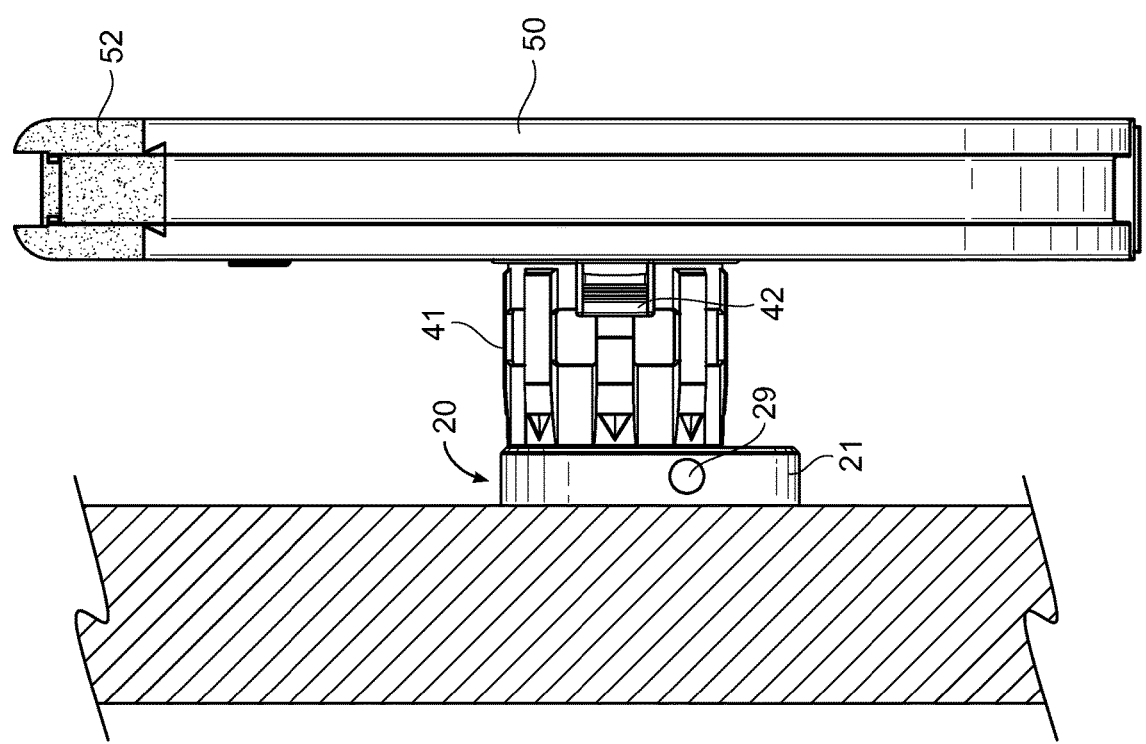
FIG. 2 is a side view of an invisible rifle wall mount, in accordance with an example embodiment.
Figure 3:
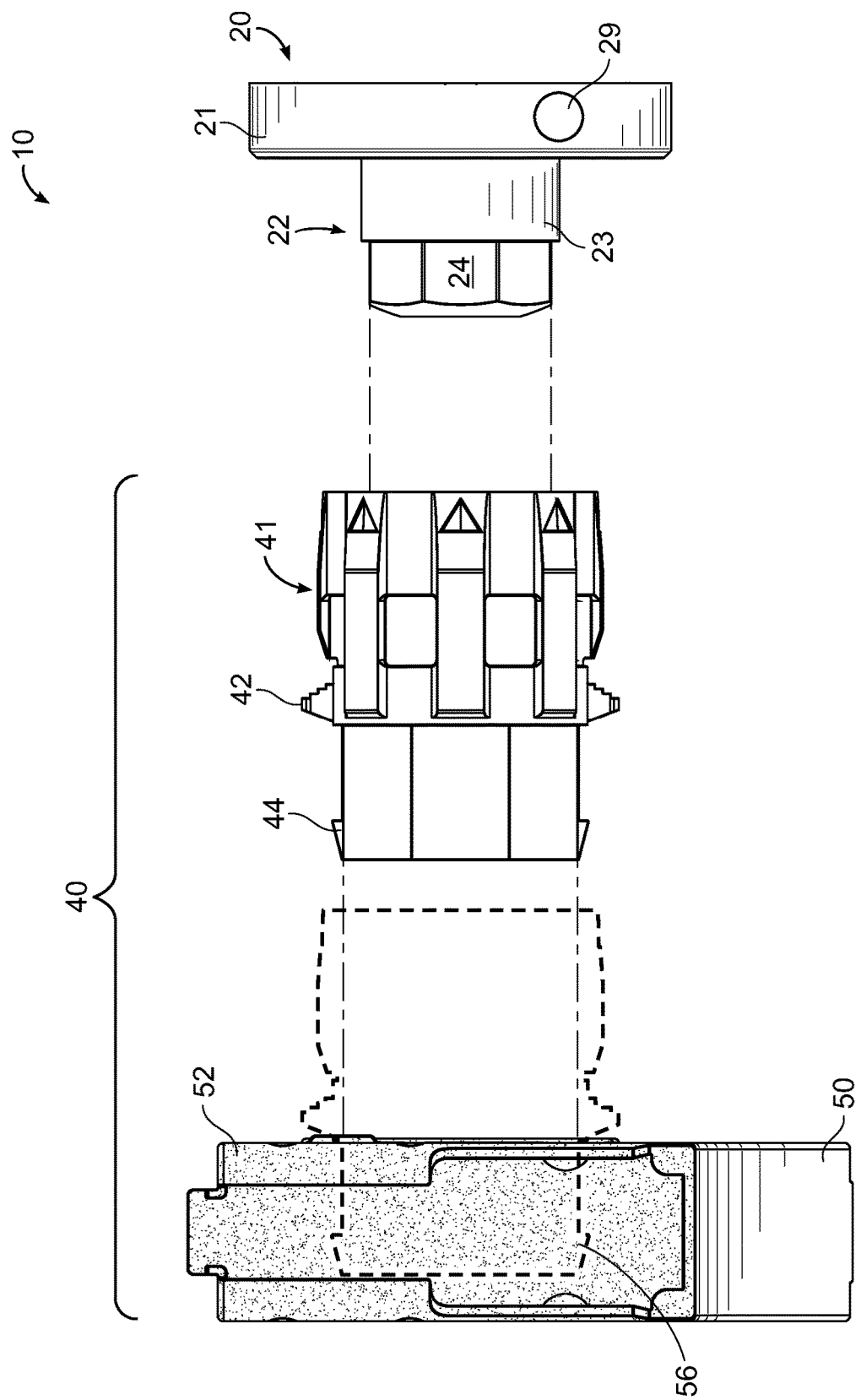
FIG. 3 is an exploded view of an invisible rifle wall mount, in accordance with an example embodiment.
Figure 6:
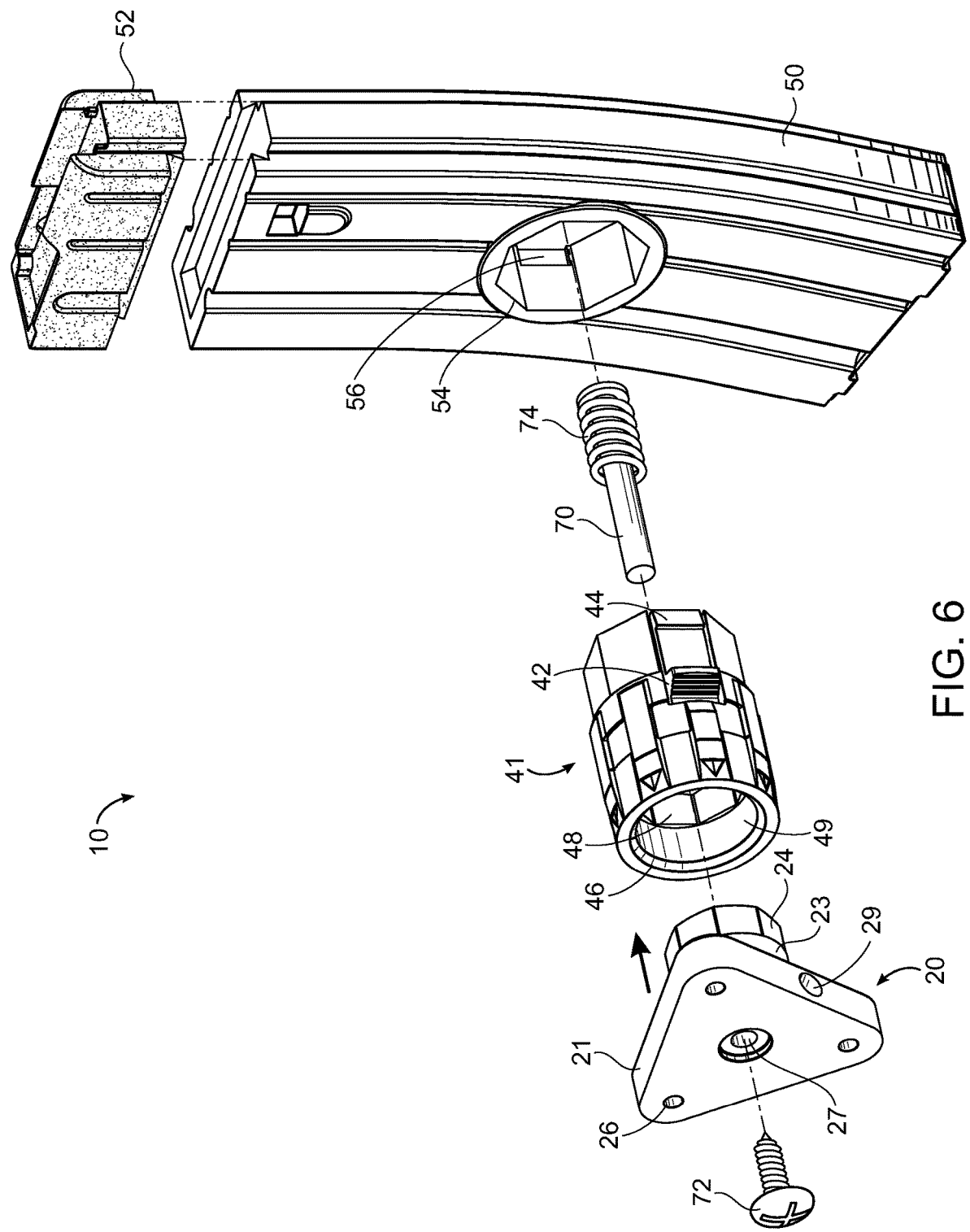
FIG. 6 is another exploded view of an invisible rifle wall mount, in accordance with an example embodiment.

As best shown in FIGS. 2, 3, and 6, an example embodiment of the invisible rifle wall mount system 10 generally comprises a base 20 for mounting on a surface, such as a wall. In addition to a conventional wall, the base 20 may be adapted for mounting on any number of different surfaces or panels, such as pegboards, slat-walls, or proprietary wall panels, such as panels with openings shaped and sized to accept connecting elements. For example, the base 20 may include hooks or other connectors for mounting on such walls or panels, or it may be configured to accept such hooks or connectors.

Figure 5:
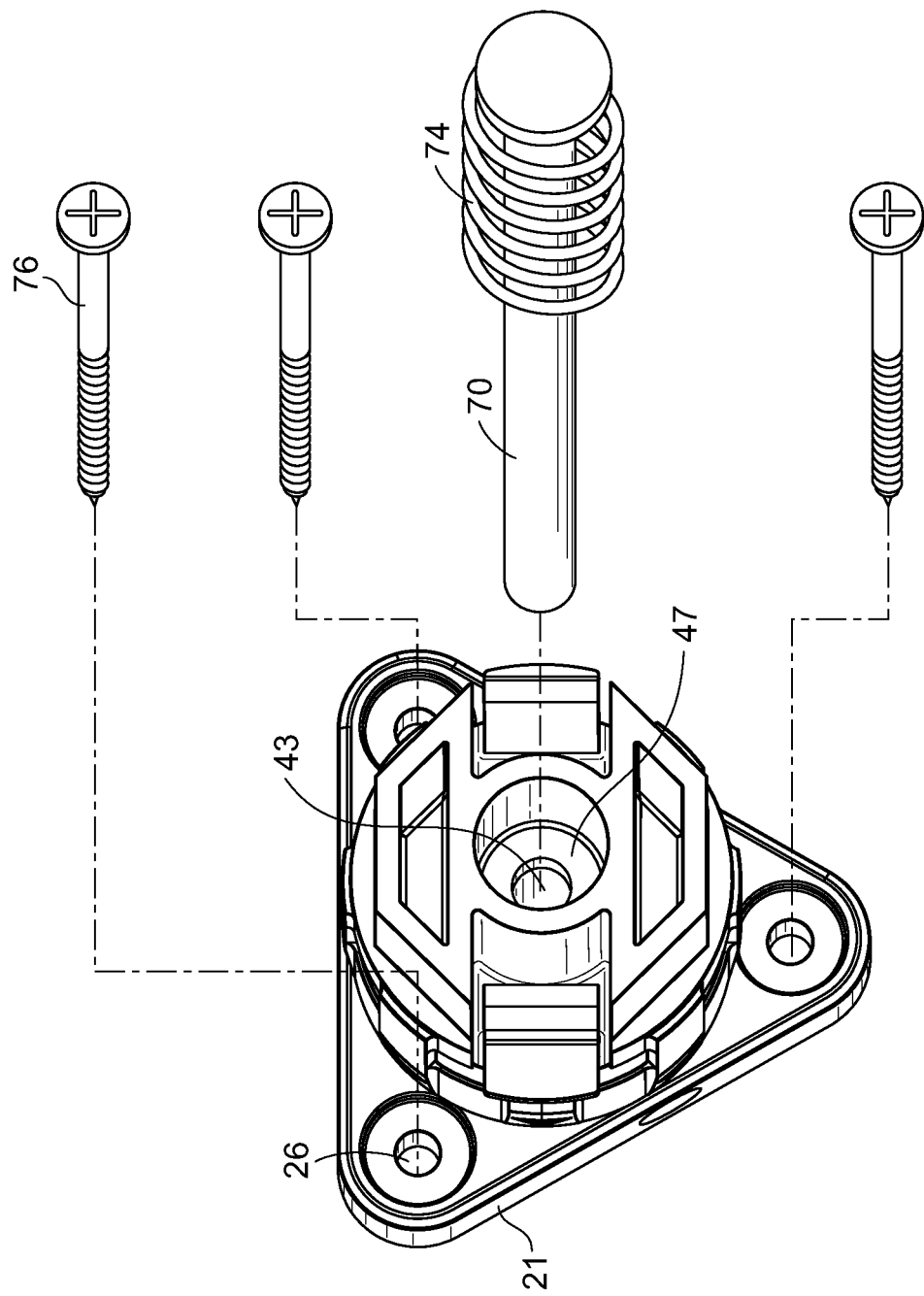
FIG. 5 is an exploded view of the base of an invisible rifle wall mount, in accordance with an example embodiment.
Figure 13:
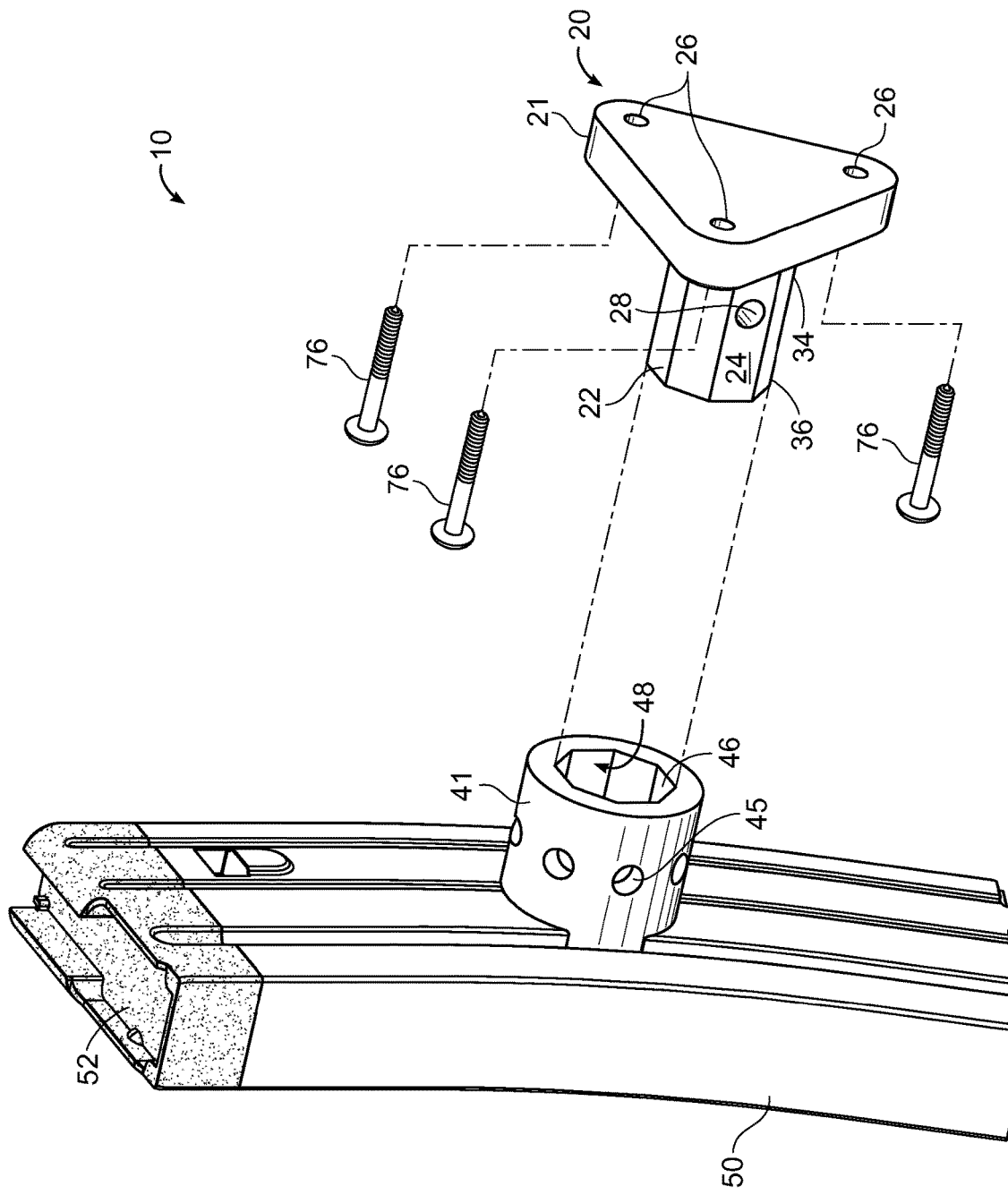
FIG. 13 is another exploded view of an invisible rifle wall mount, in accordance with an example embodiment.

The base 20 may include a generally flat wall-mount portion 21 and a plug 22 extending away from the wall-mount portion 21, the plug 22 comprising a plurality of plug locking surfaces 24 arranged circumferentially on the plug 22, for example, on the outer surface of the plug 22 toward the second end 36 of the plug. The wall-mount portion 21 of the base 20 may be triangular as shown, or it may be any other shape that is practical and suited for its purpose. The base 20 may also have a number of mounting holes 26, for attaching the wall-mount portion 21 securely to a wall or any suitable surface, as shown for example in FIG. 2, where the mounting holes are at the points of the triangle. As shown in FIGS. 5 and 13, the base 20 can be mounted to a wall with mounting screws 76, although other mounting components or methods are also possible. In addition, the exact shape of the wall-mount portion is not critical—thus, it need not be triangular. In addition to a flat surface or conventional wall, the wall-mount portion 21 of base 20 may also be adapted for mounting on any number of surfaces or panels, such as pegboards, slat-walls, or proprietary wall panels, such as panels with openings shaped and sized to accept connecting elements. For example, the wall-mount portion 21 may include hooks or other connectors for mounting on such walls or panels, or it may simply be designed and configured to accept such hooks or connectors.

Figure 11:
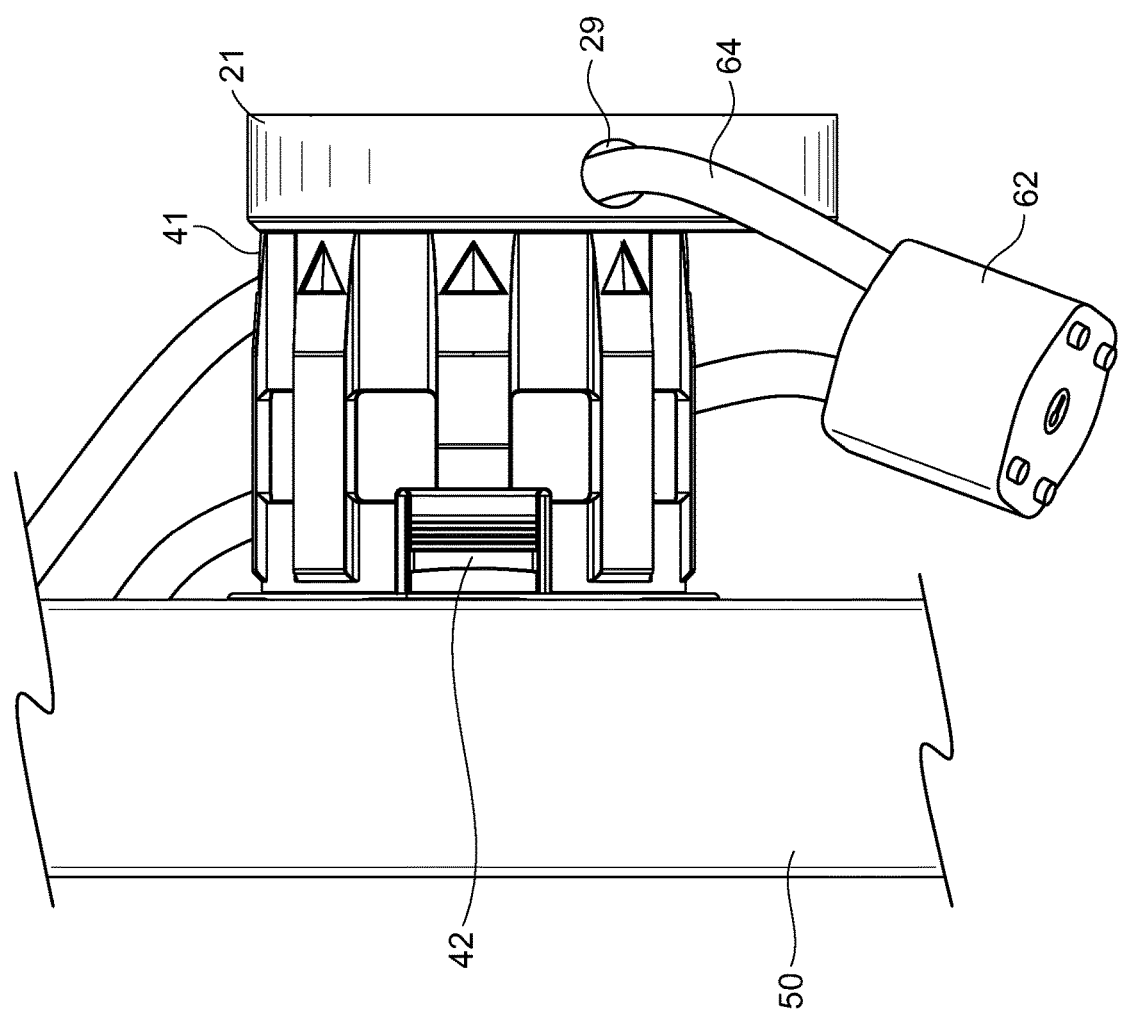
FIG. 11 is another side view of an invisible rifle wall mount, in accordance with an example embodiment.

The wall-mount portion of the embodiment of FIG. 3 may include a locking hole 29, which may receive a locking cable 64 of a cable lock 62 (see, e.g., FIGS. 11 and 17), which is also threaded through the trigger guard 92 of rifle 90 if desired, to lock the rifle 90 to the wall mount system. In the embodiment of FIG. 13, the plug hole 28 serves much the same function, although, in addition, the cable 64 in this embodiment also serves to hold the plug 22 and the socket 41 together. As an alternative to the cable lock 62, the plug 22 and socket 41 of the embodiment shown in FIG. 13 can be held together by a locking pin 60, or other locking member, which can be in any form, so long as the locking member extends through a hole 45 in socket 41 and into plug hole 28 in the plug 22.

As further shown in FIGS. 3 and 13, the plug 22 may include a number of plug locking surfaces 24, which may be flat surfaces. In the embodiments shown, the cross-sectional shape of the plug through this portion is octagonal, although other numbers of sides and other entirely different profiles are also possible, so long as the function of interlocking with the sides or profile of the socket 41 of the system is accomplished. As shown in FIGS. 3 and 6, for example, the plug locking surfaces 24 may only be present on the free end of the plug 22, with the remainder of the plug being smooth and cylindrical, represented by cylindrical portion 23 in the Figures. In other embodiments, the plug locking surfaces 24 may extend over the entire length of the plug 22, as shown in FIG. 13, so that the plug is generally octagonal or has an otherwise consistent cross section over its entire length.

Figure 4:
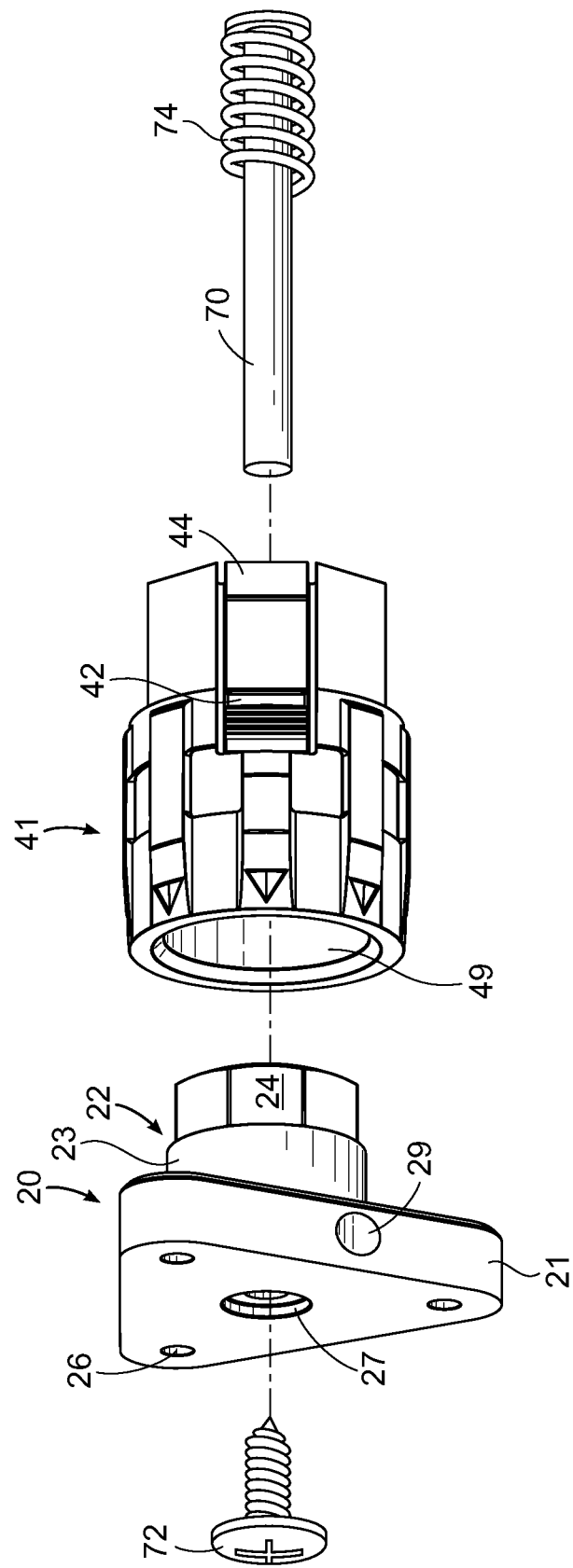
FIG. 4 is another exploded view of an invisible rifle wall mount, in accordance with an example embodiment.

The plug 22, as mentioned, generally extends outward from the wall-mount portion 21 of the base 20, so that it can receive a socket 41 that slides over the plug 22. In one embodiment, as shown for example in FIGS. 4 and 6, the base 20 may have a central binding post opening 27 extending through the wall-mount portion 21 and the plug 22 of the base. As mentioned, this opening is central, along the axis of the base 22, and may have a larger portion at the rear part of the wall-mount portion 21, so that the head of binding screw 72 can be below the rear surface of the base, allowing for flush mount to a wall. As will be discussed further below, a binding post 70 can extend through the plug 22 and the socket 41, holding them together in a spring-biased, sliding connection or coupling.

An alternative embodiment of the wall-mount base 20 is shown in FIGS. 12-16. In this embodiment, the system 10 operates much as with the previously-described embodiment, with the following differences. Rather than being coupled to the socket under spring bias, the plug 22 and socket are generally separate until the rifle mount is desired to be attached to the base 20. To mount a rifle 90, the base 20 is first mounted on the wall, as discussed. Next, the rifle mount, comprising the magazine, the socket 41, and the sizing adapter 52 are pushed onto the plug 22 in a desired rotational orientation. In any possible orientation, the locking surfaces 24 and 48 will hold the socket 41 and plug 22 in position rotationally. Further, the plug comprises a plug hole 28, and the socket comprises a number of socket holes 45. When the socket 41 and plug 22 are coupled, with or without a rifle 90 in place, the aforementioned holes 28 and 45 will line up.

Figure 14:
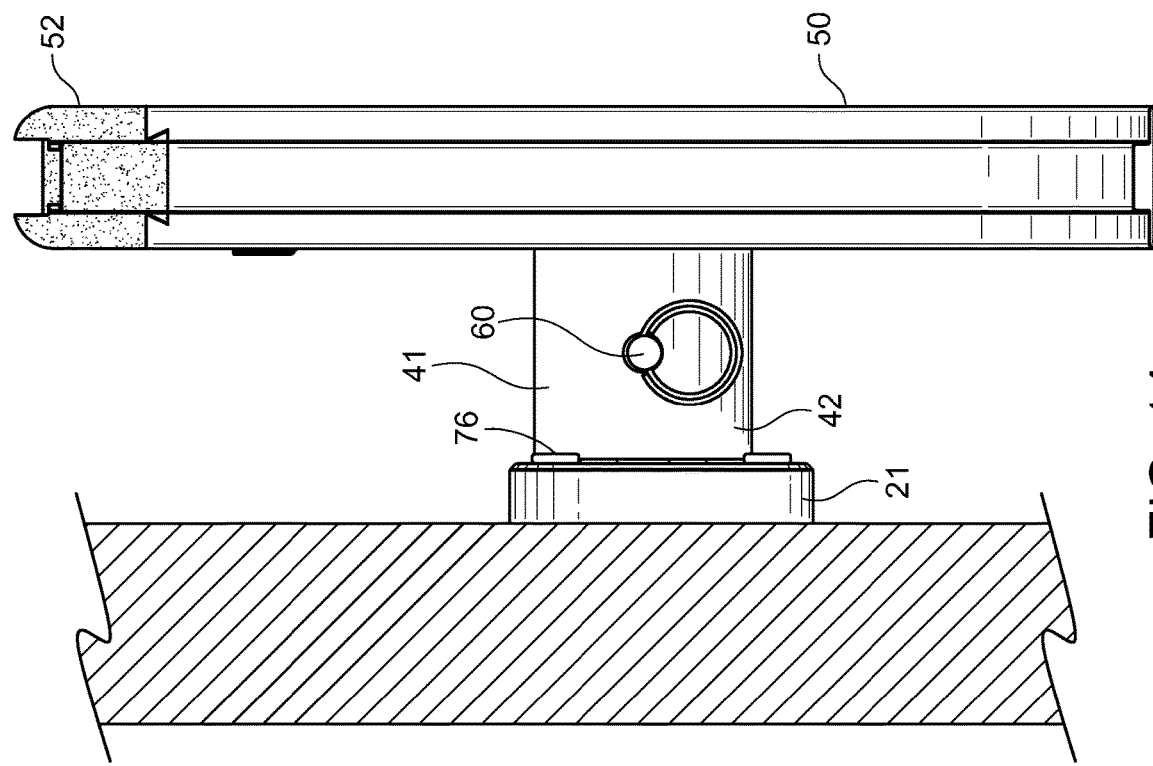
FIG. 14 is another side view of an invisible rifle wall mount, in accordance with an example embodiment.
Figure 16:
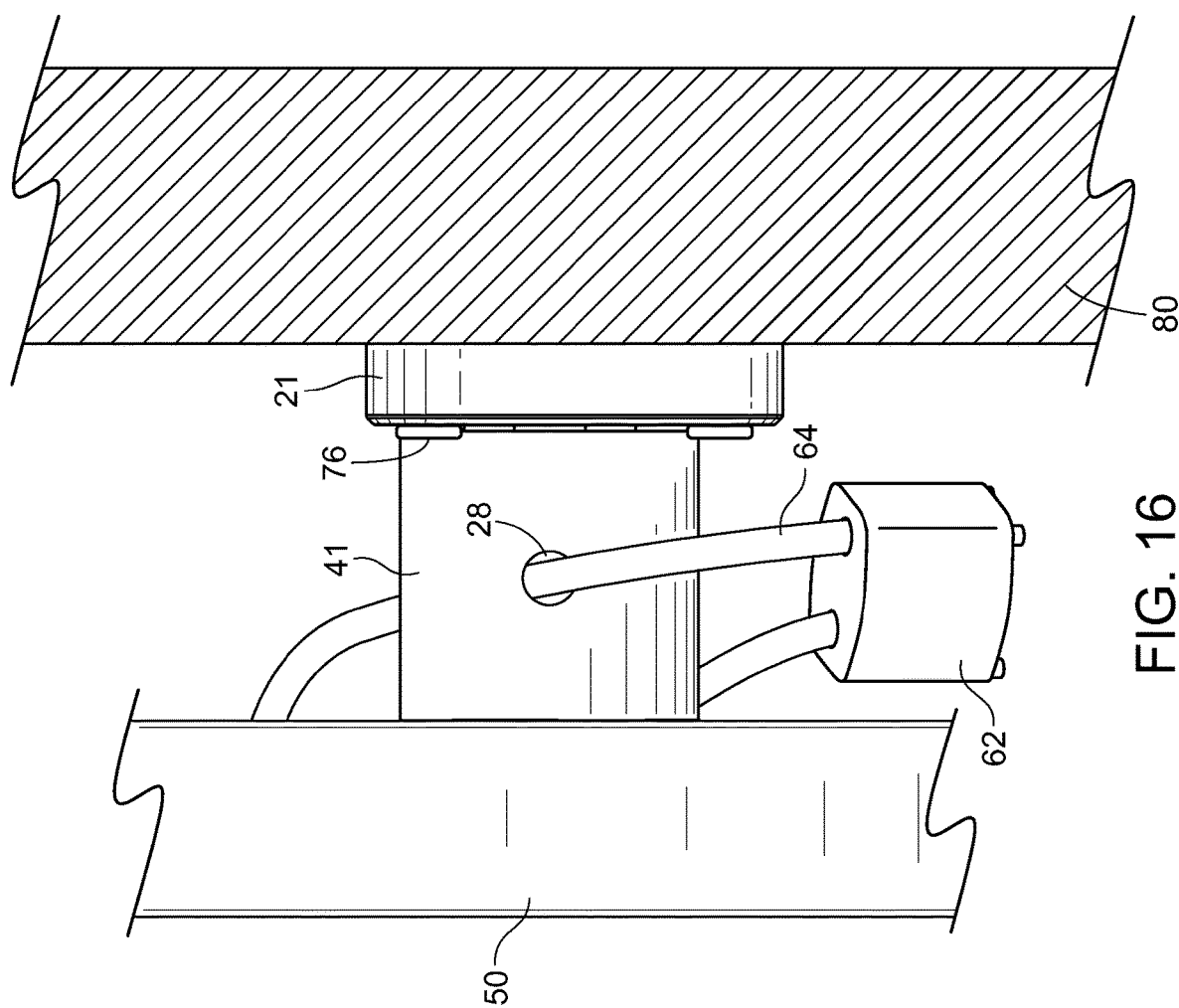
FIG. 16 is another side view of an invisible rifle wall mount, in accordance with an example embodiment.
Figure 17:
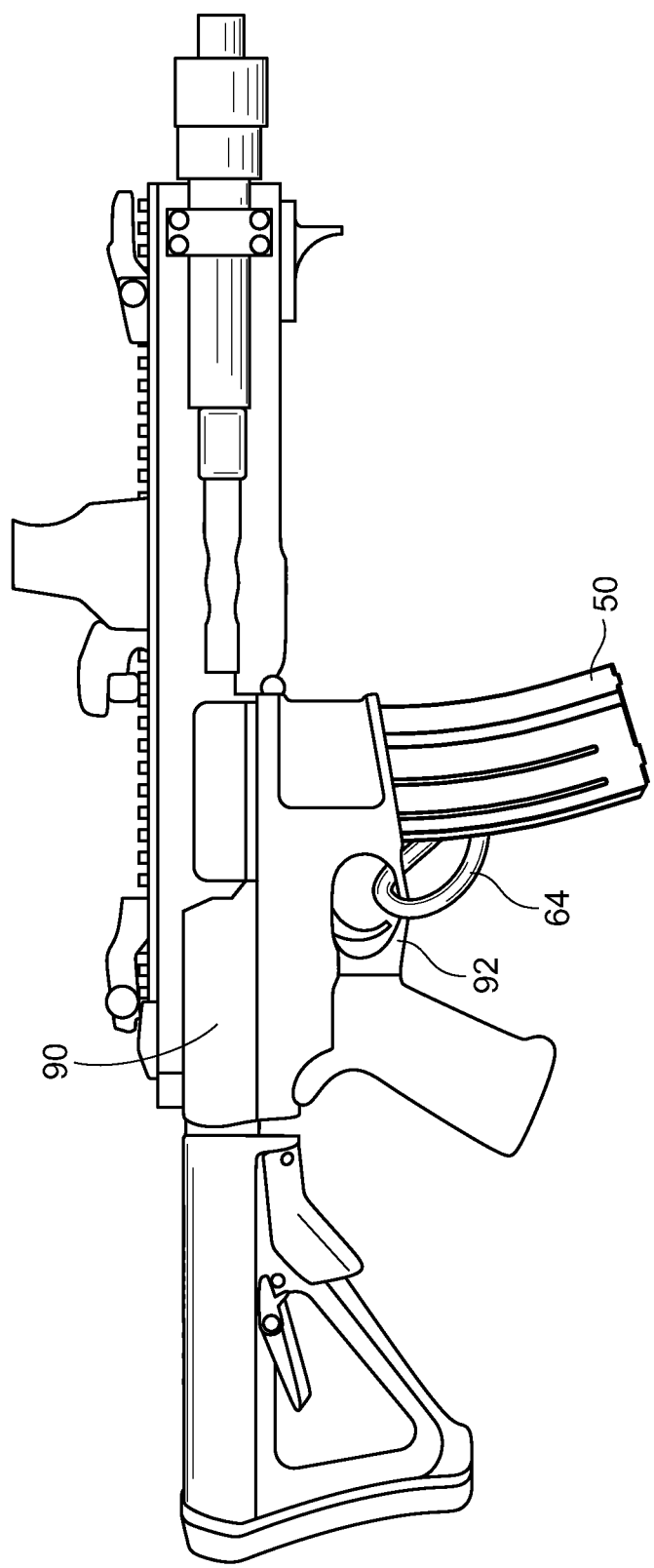
FIG. 17 is a front view of an invisible rifle wall mount in use, in accordance with an example embodiment.

When the socket 41 and plug 22 are aligned, a securing member, such as a locking pin 60 or the cable 64 of a cable lock 62, may be inserted through both holes, so that the securing member extends all the way through the socket 41 and the plug 22. FIGS. 14 and 16 illustrate the alternative mount assembled in a horizontal position, with FIG. 14 showing a locking pin 60, and FIG. 16 illustrating the cable 64 of a cable lock 62 acting as the securing member. As shown in FIGS. 15 and 17, the cable 64 of the lock may also be threaded through the trigger guard 92 of rifle 90, thus preventing its removal and use without a key. FIG. 21 illustrates the locking pin 60 and the cable lock 62 in greater detail.

C. Rifle Mount

The system 10 may also comprise a rifle mount 40 generally comprising a magazine 50 and a socket 41 extending from the magazine, the socket 41 adapted for coupling to the plug 22, the socket 41 comprising a socket opening 46 and a plurality of socket locking surfaces 48 in the opening 46 that mate with, or engage, the plug locking surfaces 24 to prevent the socket 41 and rifle mount 40 from rotating relative to the plug 22 when the socket 41 and the plug 22 are coupled. The magazine 50 is also connectable to a sizing adapter 52, so that the magazine will fit and lock into a standard magazine receptacle in a rifle. Magazines usable with the wall-mount system 10 may come in a number of sizes and forms, so that they may be used with a wide variety of rifles or even airsoft guns.

Figure 18:
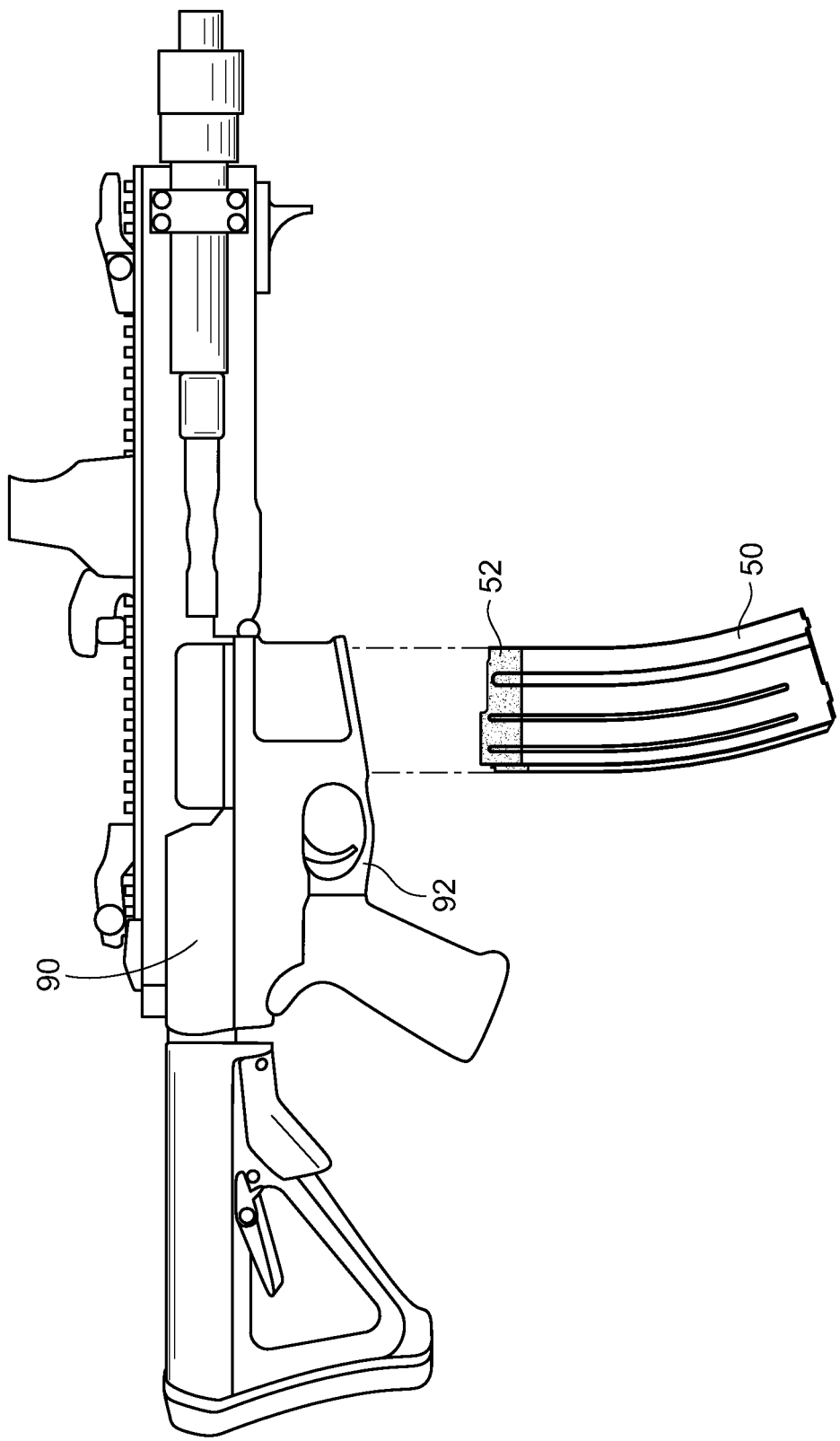
FIG. 18 is another front view of an invisible rifle wall mount in use, in accordance with an example embodiment.
Figure 19:
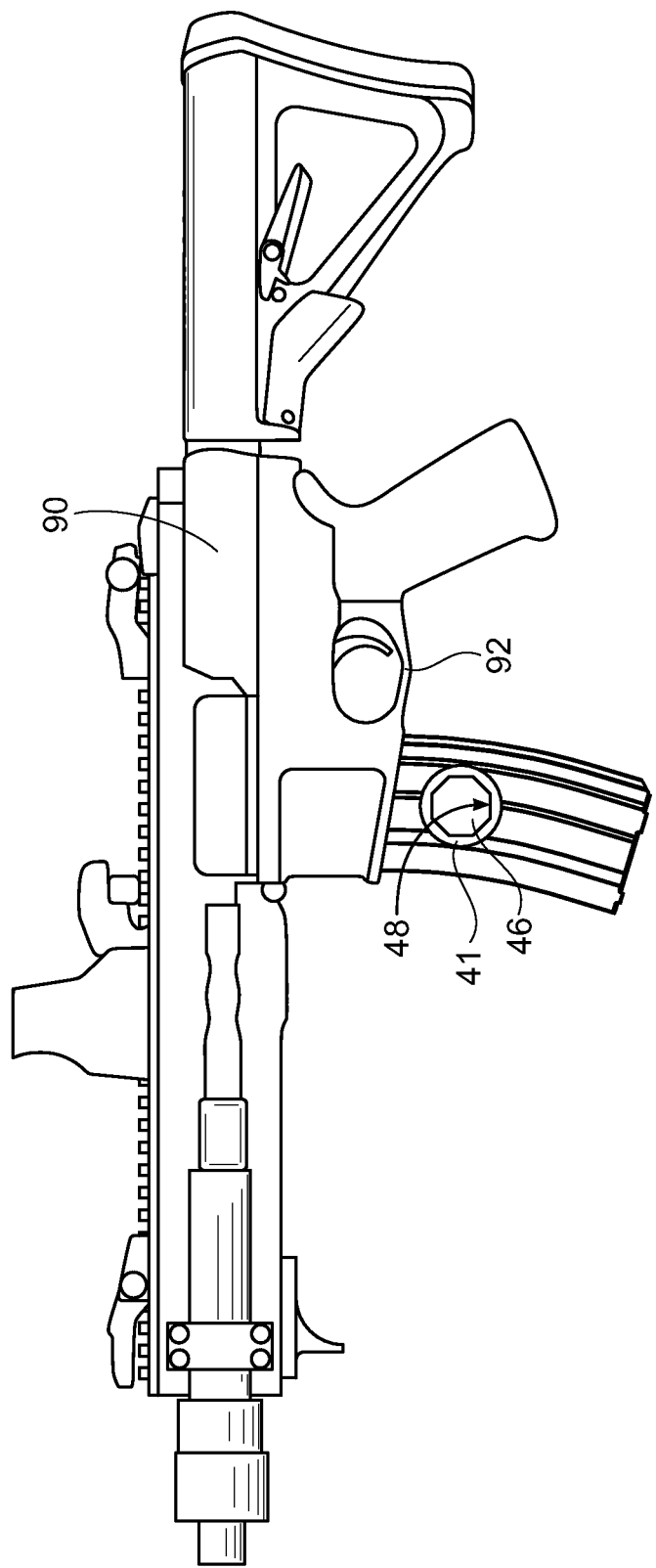
FIG. 19 is a back view of an invisible rifle wall mount in use, in accordance with an example embodiment.

For example, the magazine 50, when connected to the sizing adapter 52, may be virtually identical in appearance to a standard magazine for a rifle 90, especially when viewed from a vantage point away from a wall, where the wall-mount system's components are not visible, as shown in FIG. 1. FIG. 18 illustrates the magazine 50, assembled to the sizing adapter 52 just before being inserted into the magazine receptacle of rifle 90, and FIG. 19 shows the rifle 90 from the opposite side with the magazine/sizing adapter inserted into the rifle 90.

Figure 9:
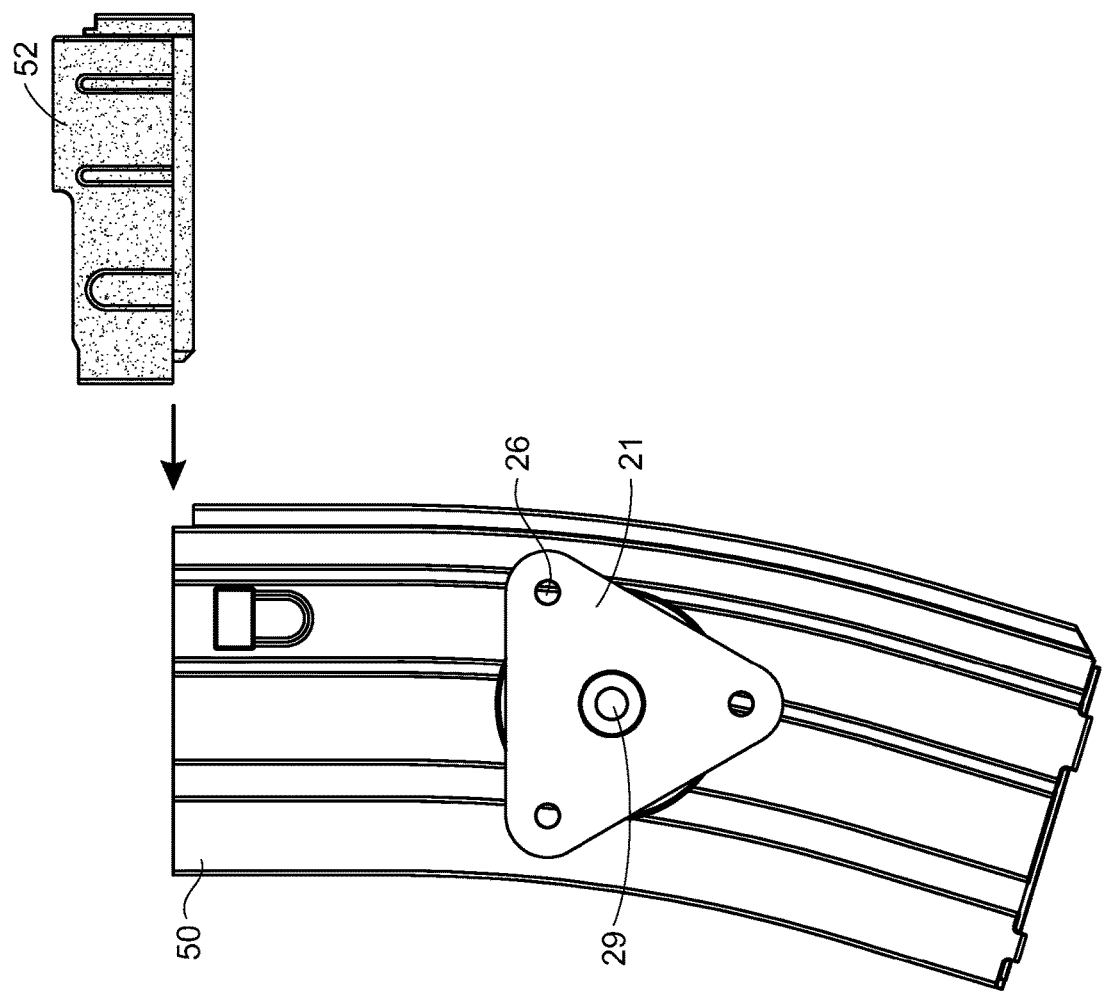
FIG. 9 is a back view of an invisible rifle wall mount, in accordance with an example embodiment.
Figure 10:
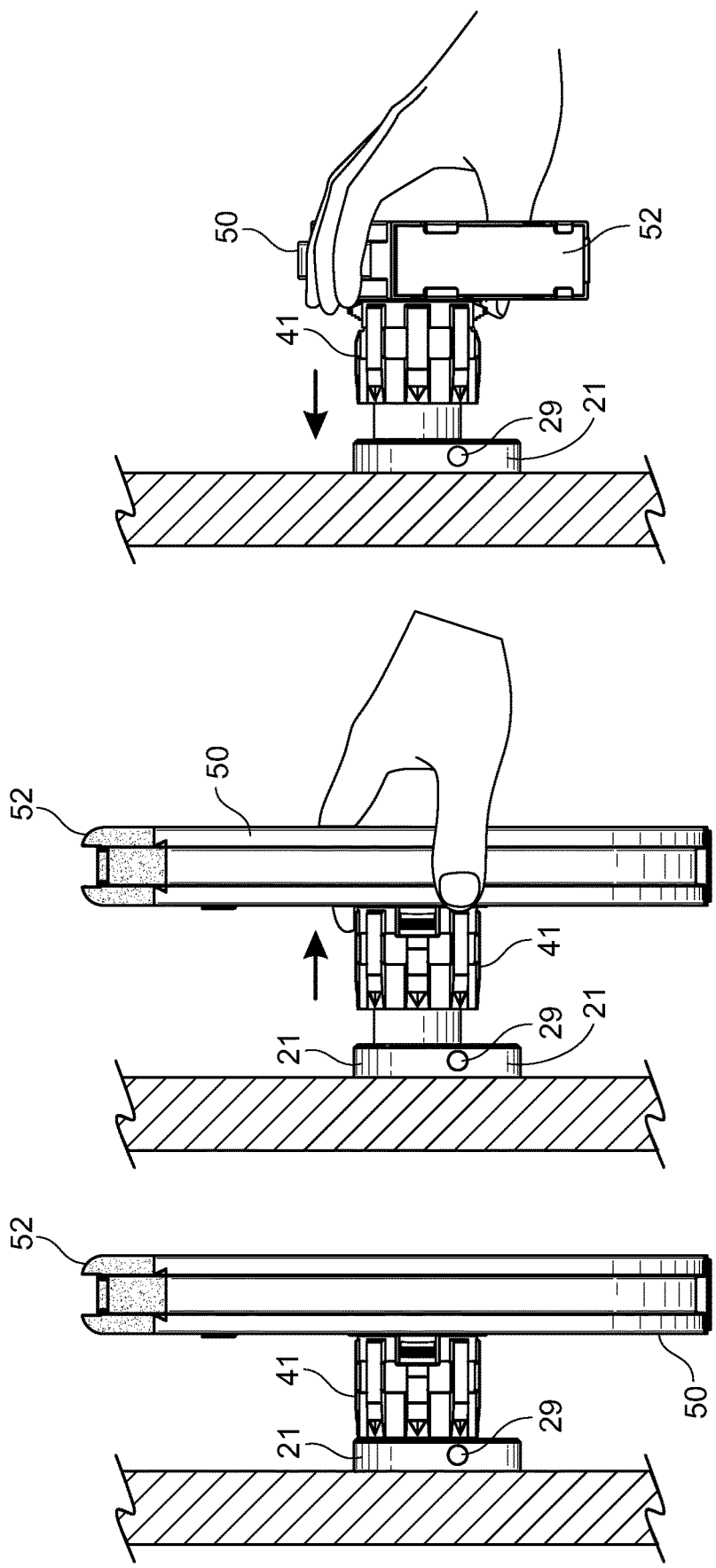
FIG. 10A is a side view of an invisible rifle wall mount, in accordance with an example embodiment.
FIG. 10B is another side view of an invisible rifle wall mount, in accordance with an example embodiment.
FIG. 10C is another side view of an invisible rifle wall mount, in accordance with an example embodiment.

The sizing adapter 52 may be attached to the magazine 50 any number of ways. As shown throughout the figures generally, and in FIGS. 6 and 9, the sizing adapter 52 may slide onto the magazine with a dovetail connection which may lock in place with a locking tab of the type well known to hold plastic and metal parts together (not shown).

As shown in FIGS. 3 and 6, as just one example, the rifle mount 40 has a magazine 50 with an opening 54, adapted and sized so that socket 41 can be inserted in the side of the magazine 50. The socket may have locking tabs 44 with a sloped front end. When the socket is inserted into the magazine 50, the walls of the magazine opening 54 will force the locking tabs 44 inward, allowing the socket to be smoothly slid into the magazine. As the socket moves deeper, the locking tabs 44, due to their resting position, which is shown in FIG. 3, will engage with magazine locking slots 56, thereby releasably coupling the socket 41 to the magazine 50. In addition to a releasable coupling, the socket 41 can also be permanently mounted on a magazine 50, which is especially suitable for the embodiment shown in FIG. 13.

As mentioned above, in the embodiment shown in FIGS. 5 and 6, for example, before being coupled to the magazine 50, the socket may be slidably coupled to the wall-mount base 20. In this configuration, the binding post 70 is inserted through socket binding post opening 43 and through the plug binding post opening 27, with binding screw 72 being screwed into the binding post 70 to keep the assembly together. As perhaps best shown in FIG. 5, spring 74 is held between the head of the binding post 70 and a shoulder 47 in the socket 41. When the socket 41 and the plug 22 are coupled by the binding post 70, the spring 74 is compressed between the head of the binding post 70 and the shoulder 47 in the socket 41. The spring 74 under compression, urges and forces the socket 41 into a first position, which is in full or maximum engagement with plug 22, so that the face of the socket 41 is in contact, or nearly in contact, with the corresponding face of the wall-mount portion 21 of the base, as shown in FIG. 2. However, the proximity of the socket to the wall-mount portion 21 of base 20 is not at all critical. In the first position, the locking surfaces 24 and 48 of the socket 41 and the plug 22 will be engaged.

Figure 7:
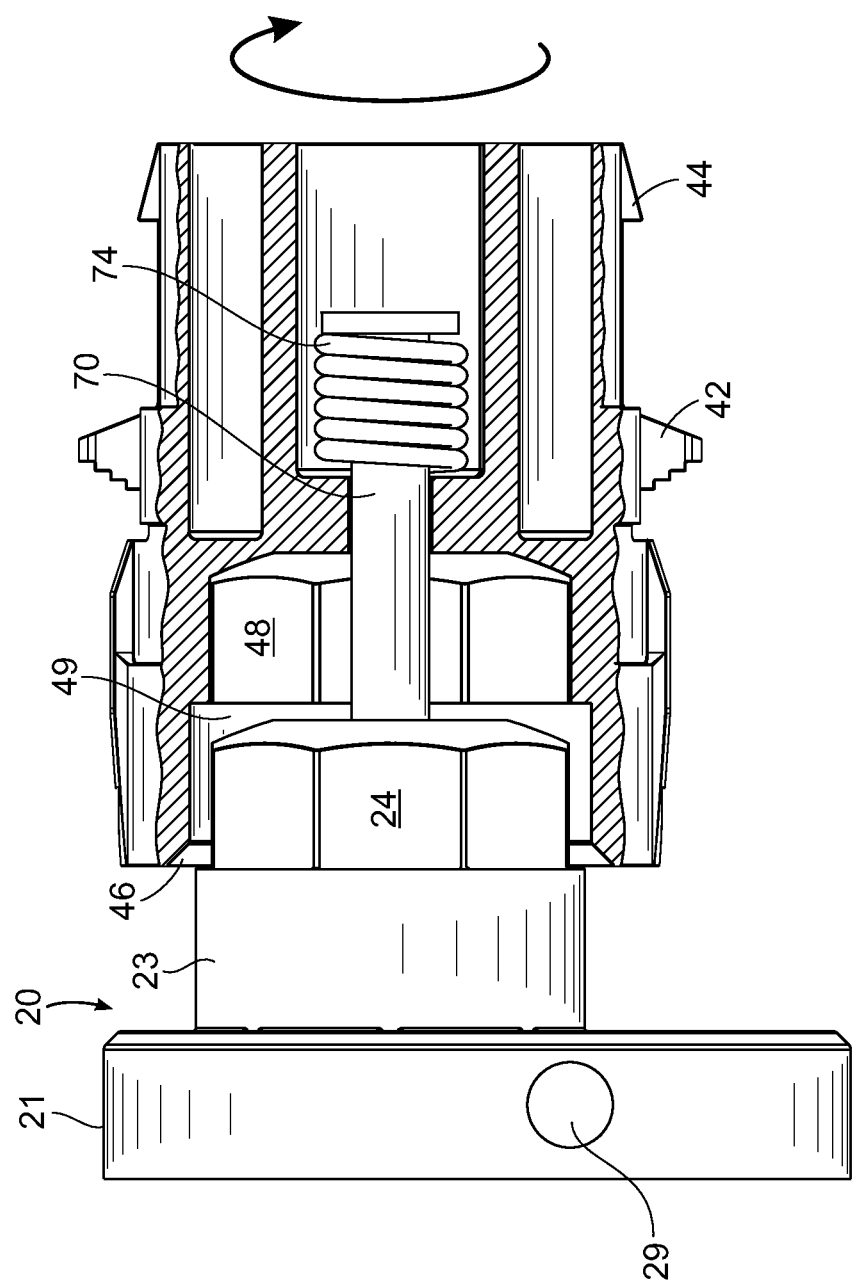
FIG. 7 is a partial sectional view of an invisible rifle wall mount, in accordance with an example embodiment.
Figure 8:
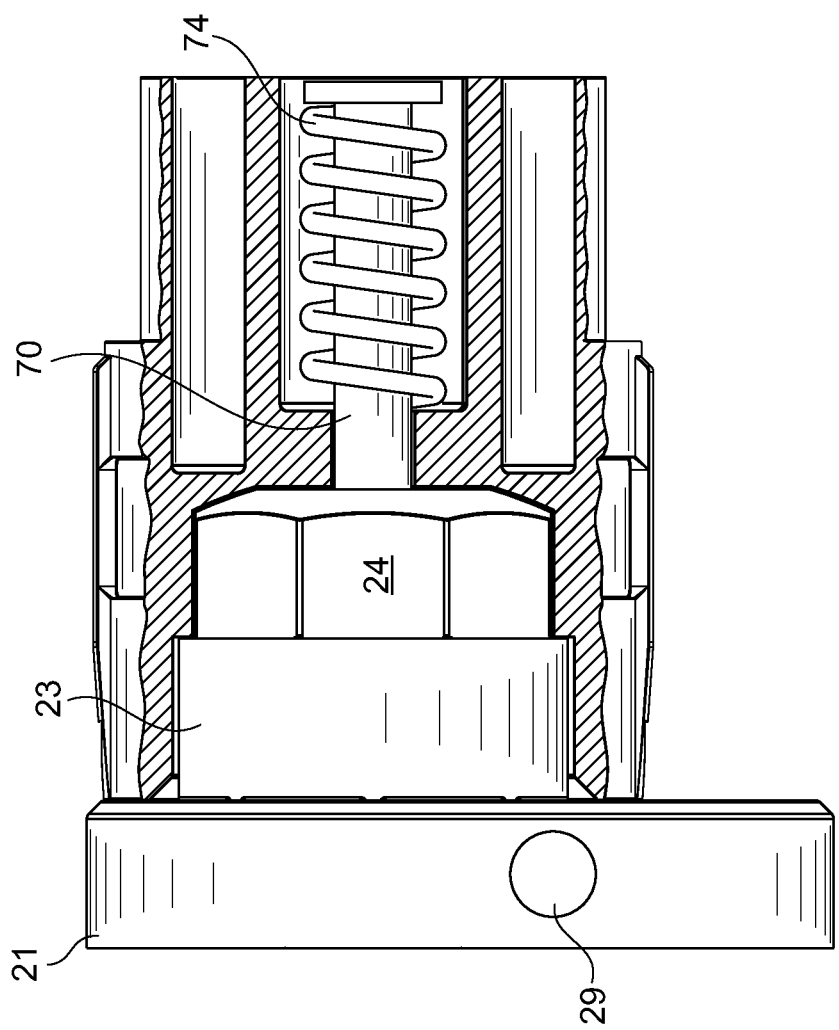
FIG. 8 is another partial sectional view of an invisible rifle wall mount, in accordance with an example embodiment.

In this state, if the socket 41 is pulled away from base 20, spring 74 will be further compressed, and the socket 41 will be in a second position, wherein the locking surfaces are out of engagement since they do not meet, as shown in FIG. 7. More specifically, the locking surfaces 24 of the plug 22 will be adjacent to the smooth, cylindrical portion 49 of the socket when the socket is in the second position relative to the plug. When so pulled away, the locking surfaces of the plug 22 and the socket 41 will be out of engagement, which in turn allows the socket to be rotated relative to the plug 22, pivoting about the binding post 70. Upon release, the locking surfaces of socket 41 and plug 22 will re-engage, as shown in FIG. 8, either in the same position they were originally in, or in a different rotational orientation.

As shown in FIG. 6, the opening 46 of the socket 41 may have a smooth, cylindrical portion 49 nearest the opening 46, with locking surfaces 48 interior to the cylindrical portion 49. When the socket 41 is pulled away from the plug 22 as described above, the locking surfaces 24 of the plug 22 will be opposite the smooth cylindrical portion 49, thus allowing the socket 41 to freely rotate with respect to the plug 22. Upon release of the socket 41 by a user, the flat locking surfaces 24 of the plug 22 will engage with the proximate flat locking surfaces 48 of the socket 41. In addition, the cylindrical portion 23 of the plug 22 can fit tightly within the cylindrical portion 49 of the socket 41, so that the entire wall mount system 10 is able to securely hold a rifle 90 on the wall.

FIGS. 13-14 illustrate a second embodiment of the system, where the socket is coupled to the plug by a securing member, such as locking pin 60. In this embodiment, the socket and plug are not coupled by a binding post, so that, when the rifle is to be mounted or rotated, the magazine 50 and socket 41 are disconnected from the plug 22 after the securing member is removed, which allows the socket 41 to be pulled away and out of engagement with the plug 22. As with other embodiments, the rifle mount can then be rotated to a different orientation, as described above, and the rifle or rifle mount can be reinstalled on the plug/wall-mount, as shown for example in FIG. 14. The locking surfaces 24 and 48 are engaged when the socket is installed onto the plug 22, and the socket/rifle mount is locked onto the base 20 by a securing member, which may be locking pin 60 or the cable 64 of cable lock 62, as shown in FIG. 15. The securing member is inserted through hole 28 and one of holes 45 to lock the assembly together.

D. Operation of Preferred Embodiment

In the embodiment of the system 10 of FIGS. 2-11, all the components of the wall-mount system are assembled and connected together. Accordingly, the base 20 and plug 22 are secured to a wall, the socket 41 is securely, but releasably, coupled to the plug 22 and to the magazine 50, and the magazine 50 is attached to a rifle 90, with the aid of the sizing adapter 52. Viewed from a position away from the wall, the wall-mount system 10, with a rifle mounted on it, itself cannot be seen, and the rifle 90 appears to float in front of the wall, as shown in FIG. 1. To assemble an embodiment of the system 10 such as the one shown in FIG. 3, the socket 41 and the plug 22 are first coupled together by the binding post 70. Next, since in this condition the mounting screws 76 or other fasteners can be accessed without interference, the base 20 is attached to the wall in a desired location.

Figure 20:
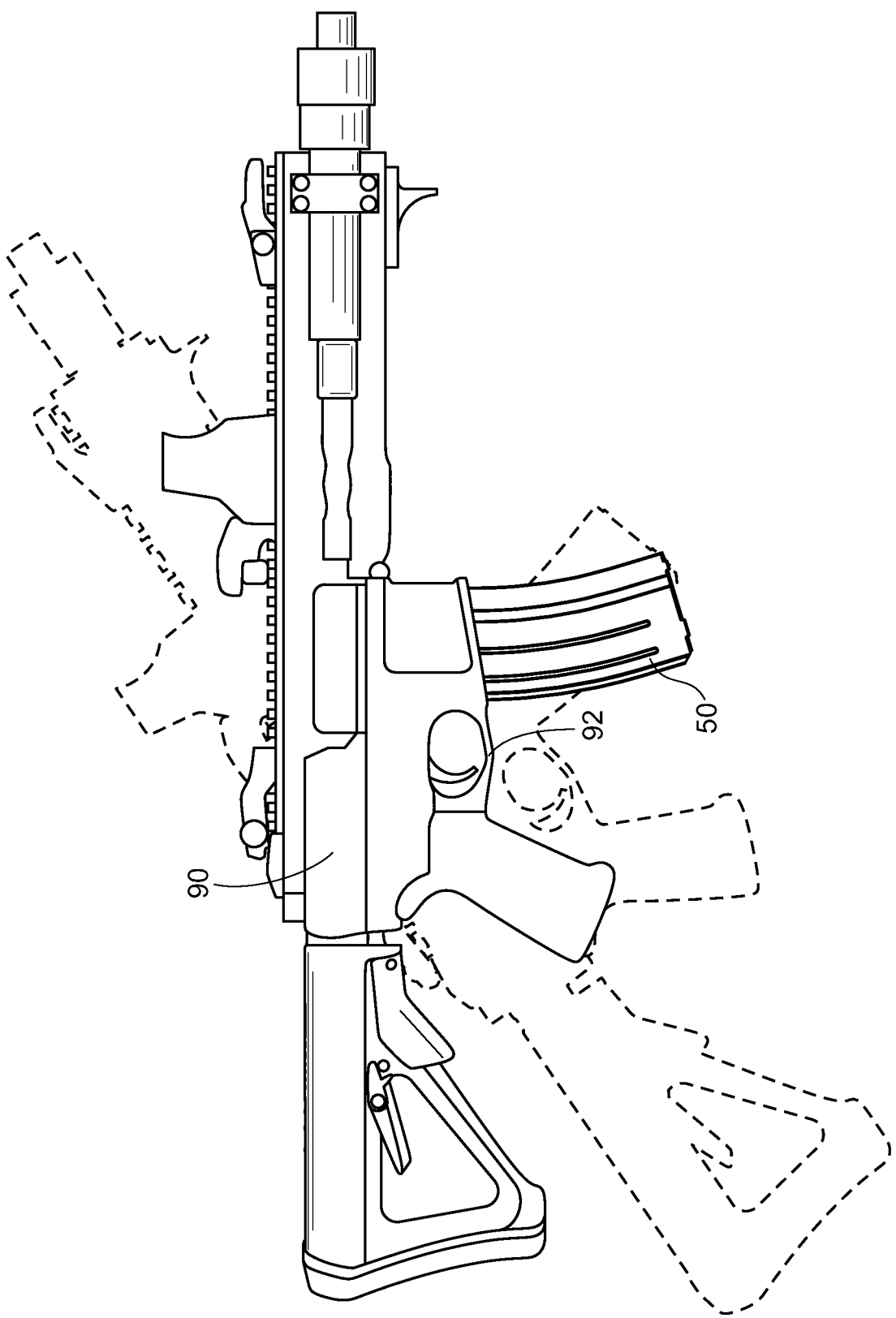
FIG. 20 is another front view of an invisible rifle wall mount in use, in accordance with an example embodiment.
Figure 9:
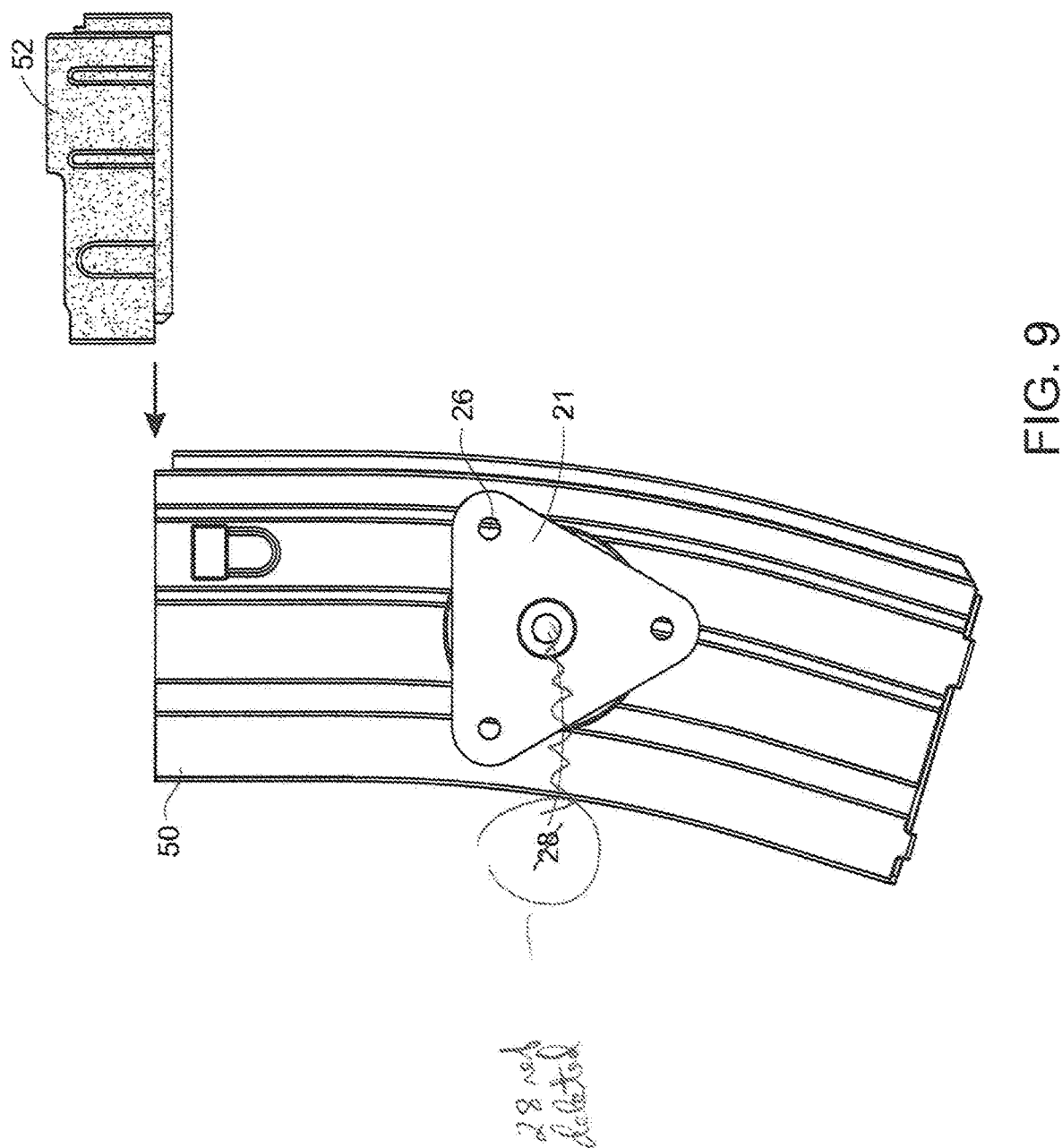

At this point, the magazine 50 with or without a sizing adapter 52 can be snapped onto the socket 41, with the resulting assembly as shown in FIG. 2. Alternatively, the magazine and/or adapter 52 can first be inserted into the rifle 90, and then the rifle 90 and magazine can be coupled to the socket 41, which extends from the wall. As mentioned briefly above, the system 10 can be used to mount a rifle in a number of rotational orientations. For example, the rifle 90 may simply be mounted horizontally, as shown in FIG. 1. In addition, it can readily be rotated to other positions as shown in FIG. 20. This rotation can be accomplished as illustrated in FIGS. 10A-10C. FIG. 10A shows the system, without a rifle, mounted horizontally on a wall. As shown in FIG. 10B, the magazine 50, or alternatively, the socket 41 without the magazine 50 connected, can be pulled away from the wall under the compression of spring 74 as described above. With the socket 41 in this position, denoted as the second position, the magazine 50 or socket 41 can be freely rotated to a new position as shown in FIG. 10C, and when released, the locking surfaces of the socket 41 and the plug 48 will engage each other, and the mount will not rotate. This procedure may also be performed with a rifle 90 already mounted, as shown in FIG. 20.

The procedure is similar for using the embodiment shown in FIGS. 13-15. where the socket is coupled to the plug by a securing member, such as locking pin 60 or the cable 64 of a cable lock 62, as shown in FIG. 21. In this embodiment, when the rifle is to be mounted or rotated, the magazine 50 and socket 41 are disconnected from the plug 22 after the securing member is removed, which allows the socket 41 to be pulled away and out of engagement with the plug 22. As with other embodiments, the rifle mount can then be rotated to a different orientation (as shown in FIG. 20, for example), as described above, and the rifle 90 or rifle mount 40 can be reinstalled on the plug/wall-mount, as shown for example in FIG. 14. The locking surfaces 24 and 48 are engaged when the socket is installed onto the plug 22, and the socket/rifle mount is locked onto the base 20 by a securing member, which may be locking pin 60 or the cable 64 of cable lock 62, as shown in FIG. 15. The securing member is inserted through hole 28 and one of holes 45 to lock the assembly together, both rotationally and slidably.

Unless otherwise defined, all technical and scientific terms used herein have the same meaning as commonly understood by one of ordinary skill in the art to which this invention belongs. Although methods and materials similar to or equivalent to those described herein can be used in the practice or testing of the invisible rifle wall mount, suitable methods and materials are described above. All publications, patent applications, patents, and other references mentioned herein are incorporated by reference in their entirety to the extent allowed by applicable law and regulations. The invisible rifle wall mount may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A wall-mount system for rifles, comprising:
    a base adapted for mounting on a surface, the base comprising a wall-mount portion and a plug extending away from the wall-mount portion, the plug comprising a plurality of plug locking surfaces arranged circumferentially on the plug;
    a rifle mount comprising a magazine and a socket extending from the magazine, the socket adapted for coupling to the plug, the socket comprising an opening and a plurality of socket locking surfaces in the opening that engage the plug locking surfaces to prevent the socket and rifle mount from rotating relative to the plug when the socket and the plug are coupled.

2. The wall-mount system for rifles of claim 1, wherein the rifle mount is alignable and lockable at different rotational angles with respect to the plug.

3. The wall-mount system for rifles of claim 1, wherein the plug comprises a multi-sided cross section.

4. The wall-mount system for rifles of claim 3, wherein the plug locking surfaces and the socket locking surfaces are flat.

5. The wall-mount system for rifles of claim 4, wherein the rifle mount is alignable and lockable at different rotational angles with respect to the plug.

6. The wall-mount system for rifles of claim 1, wherein the plug and the socket are slidably coupled by a spring-loaded binding post comprising a spring, the socket being slidable relative to the plug, between a first position and a second position, wherein the first position is closer to the wall-mount portion than the second position;
    wherein the spring urges the socket toward the first position; and
    wherein the plug locking surfaces and the socket locking surfaces engage when the socket is in the first position and disengage when the socket is in the second position.

7. The wall-mount system for rifles of claim 6, wherein the rifle mount is alignable and lockable at different rotational angles with respect to the plug.

8. The wall-mount system for rifles of claim 6, wherein the rifle mount is rotatable with respect to the plug when the socket is in the second position.

9. The wall-mount system for rifles of claim 6, wherein the plug comprises a multi-sided cross section.

10. The wall-mount system for rifles of claim 9, wherein the plug locking surfaces and the socket locking surfaces are flat.

11. The wall-mount system for rifles of claim 10, wherein the rifle mount is alignable and lockable at different rotational angles with respect to the plug.

12. The wall-mount system for rifles of claim 11, wherein the plug comprises an octagonal cross section.

13. The wall-mount system for rifles of claim 1, further comprising a sizing adapter attached to the magazine, wherein the sizing adapter is sized and shaped to make the magazine insertable into a magazine receptacle of a rifle.

14. The wall-mount system for rifles of claim 13, wherein the socket is releasably connected to the magazine.

15. The wall-mount system for rifles of claim 14, wherein the socket is adapted for insertion in a magazine opening, and wherein the socket is connected to the magazine by locking tabs that releasably engage magazine locking slots.

16. A wall-mount system for rifles, comprising:
    a base adapted for mounting on a surface, the base comprising a plug with a plug hole extending transversely into the plug, the plug comprising a multi-sided cross section;
    a rifle mount comprising a magazine and a socket extending from the magazine, the socket configured for coupling to the plug, the socket comprising a socket hole alignable with the plug hole when the plug is coupled to the socket;
    wherein the rifle mount is releasably secured to the wall-mount base by insertion of a securing member through the socket hole and into the plug hole.

17. The wall-mount system for rifles of claim 16, wherein the socket comprises a multi-sided cross section that mates with the cross section of the plug to prevent the socket from rotating relative to the plug when the plug is coupled to the socket.

18. The wall-mount system for rifles of claim 17, wherein the socket is alignable at different rotational angles with respect to the plug.

19. The wall-mount system for rifles of claim 17, wherein the socket comprises a plurality of socket holes, each alignable with the plug hole when the rifle mount is in a different rotational orientation with respect to the plug, and wherein the rifle mount is releasably securable in different orientations when a different socket hole is aligned with the plug hole.

* * * * *